US009684920B2

(12) United States Patent
Kalgi et al.

(10) Patent No.: US 9,684,920 B2
(45) Date of Patent: Jun. 20, 2017

(54) DUAL ENCODING OF MACHINE READABLE CODE FOR AUTOMATIC SCAN-INITIATED PURCHASE OR UNIFORM RESOURCE LOCATOR CHECKOUT

(71) Applicant: Visa International Service Association, San Francisco, CA (US)

(72) Inventors: Avinash Kalgi, Kirkland, WA (US); Keith Bailey, Orem, UT (US); Matthew Ward-Steinman, Seattle, WA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 667 days.

(21) Appl. No.: 13/770,631

(22) Filed: Feb. 19, 2013

(65) Prior Publication Data
US 2014/0025538 A1    Jan. 23, 2014

Related U.S. Application Data

(60) Provisional application No. 61/673,686, filed on Jul. 19, 2012.

(51) Int. Cl.
*G06Q 30/06* (2012.01)
(52) U.S. Cl.
CPC .................... *G06Q 30/0623* (2013.01)
(58) Field of Classification Search
CPC ........ G06Q 30/00; G06Q 20/38; G06Q 20/20; G06Q 20/382
See application file for complete search history.

(56) References Cited

U.S. PATENT DOCUMENTS 7,441,706 B1 * 10/2008 Schuessler ........ G06F 17/30879
235/462.01
8,010,621 B2    8/2011 Zilliacus
(Continued)

FOREIGN PATENT DOCUMENTS

| KR | 10-2004-0064162 A | 7/2004 |
| KR | 10-2006-0083511 A | 7/2006 |
| KR | 10-2007-0098058 A | 10/2007 |

OTHER PUBLICATIONS

International Search Report and Written Opinion mailed Sep. 27, 2013 in PCT/US2013/046425, 11 pages.
U.S. Appl. No. 61/652,005, filed May 25, 2012.

*Primary Examiner* — Kathleen Palavecino
*Assistant Examiner* — Abby Flynn
(74) *Attorney, Agent, or Firm* — Kilpatrick Townsend & Stockton LLP

(57) ABSTRACT

Embodiments of the invention are directed to systems and methods for allowing a single representation of a trigger for payment across different environments using machine readable codes. A machine readable code may be encoded with a URL and information about a product to which the machine readable code is attached. A first electronic device may be able to scan and decode the machine readable code into first recognizable product information using a complaint application. The compliant application may populate a first form on the first electronic device for a first transaction with the recognizable product information without having to access a server. A non-compliant application on a second electronic device will launch a browser using the URL and provide the unrecognizable product information to the server for decoding. The server will decode the unrecognizable product information into a second recognizable product information that may be used to populate a second form for a second transaction.

12 Claims, 15 Drawing Sheets

(56) References Cited

U.S. PATENT DOCUMENTS

| | | | | |
|---|---|---|---|---|
| 2002/0052792 | A1* | 5/2002 | Johnson et al. | 705/19 |
| 2002/0152241 | A1* | 10/2002 | Hepworth | G06K 19/06 |
| | | | | 715/236 |
| 2003/0055754 | A1* | 3/2003 | Sullivan | 705/31 |
| 2005/0011957 | A1* | 1/2005 | Attia et al. | 235/462.46 |
| 2006/0036502 | A1* | 2/2006 | Farrell | 705/23 |
| 2006/0065733 | A1* | 3/2006 | Lee | G06F 17/30879 |
| | | | | 235/462.01 |
| 2007/0181691 | A1* | 8/2007 | Chang | 235/462.41 |
| 2007/0194123 | A1* | 8/2007 | Frantz et al. | 235/462.45 |
| 2009/0112757 | A1* | 4/2009 | Hammad et al. | 705/39 |
| 2009/0149200 | A1* | 6/2009 | Jayasinghe et al. | 455/456.3 |
| 2010/0306318 | A1* | 12/2010 | Fitzpatrick | G06F 17/30867 |
| | | | | 709/206 |
| 2011/0099091 | A1 | 4/2011 | Woolston | |
| 2011/0137706 | A1 | 6/2011 | Howard et al. | |
| 2011/0137742 | A1* | 6/2011 | Parikh | G06Q 20/04 |
| | | | | 705/26.1 |
| 2011/0145093 | A1* | 6/2011 | Paradise et al. | 705/26.41 |
| 2011/0215146 | A1* | 9/2011 | Shams | 235/383 |
| 2011/0238473 | A1 | 9/2011 | Sankolli | |
| 2011/0264527 | A1* | 10/2011 | Fitzpatrick | G06Q 30/02 |
| | | | | 705/14.55 |
| 2012/0160911 | A1 | 6/2012 | Smith | |
| 2013/0112746 | A1* | 5/2013 | Krell | G06K 5/00 |
| | | | | 235/380 |

* cited by examiner

Decoded machine readable code data

… (1)

DUAL ENCODING OF MACHINE READABLE CODE FOR AUTOMATIC SCAN-INITIATED PURCHASE OR UNIFORM RESOURCE LOCATOR CHECKOUT

CROSS-REFERENCES TO RELATED APPLICATIONS

This application is a non-provisional application of and claims the benefit of priority of U.S. Provisional Application No. 61/673,686, filed on Jul. 19, 2012, which is herein incorporated by reference in its entirety for all purposes.

BACKGROUND

Machine readable codes, such as, barcodes, provide machine readable data relating to an object to which it is attached. Over the years, two-dimensional bar codes have become popular due to their large storage capacity, durability and fast readability to store information about products and services. Some examples of two-dimensional matrix barcodes include Datamatrix, Maxicode (Created by United Parcel Service), and the QR Code® (Trademark registered to Denso Corp. of Tokyo, Japan).

QR Code® has been widely used to store information about a product or services. Merchants have been trying to come up with creative ways to attract consumers by using QR Code® for marketing by providing information that can be easily accessed by scanning the QR Code® using an embedded camera within a user's mobile device (e.g., a smart phone or a tablet) or a code reader. QR Codes® are also being used on smart posters to provide real time updates on special events, sales, transport options, airline bookings, etc., to enrich consumers' experience.

When a QR Code® is scanned using an electronic device a common response is to open a certain website in a web browser on the device that captured the QR Code®. Some QR Code® reader applications are able to recognize the QR Code® and view the information encoded in the code, while others can simply open URLs (Uniform Resource Locators) or display text. A QR Code® scanned by a device that is not able to recognize the code would simply display some text that may be not meaningful. This is especially true when certain QR Codes® are designed to be scanned by custom code readers, so any off-the-shelf code reader would simply display unrecognizable text after scanning those QR Codes®.

Furthermore, internet access may be spotty, unreliable and expensive in some cases, therefore, product information may not be available at all the times if the website with the product information cannot be accessed reliably using the device.

Embodiments of the invention address this and other problems, individually and collectively.

BRIEF SUMMARY

Embodiments of the invention are directed to systems and methods for purchasing products or services by a consumer's electronic device with minimal hits to a server. Some non-limiting examples of electronic devices are mobile devices (mobile phones, tablets, laptops, notebooks, PDAs, etc.), personal computers, and such. Information about a product or service may be encoded in a machine readable code, such as a QR Code®, associated with the product. The machine readable code may comprise a URL and product information encoded using an Internet safe encoding mechanism. In some embodiments of the invention, in order to maintain data confidentiality and to reduce likelihood of fraud, the information may also be encrypted using a suitable encryption algorithm and a key. This may ensure that the relevant information may only be recovered by the intended recipient by using the appropriate key.

A first electronic device with a compliant machine readable code reader module scans the machine readable code associated with the product using a scanning device. A decoding module in the first electronic device may decode the machine readable code to form decoded machine readable code data comprising the address associated with a host site operated by a central server computer and the recognizable additional information related to the product. The recognizable additional information may be used to populate a form on the first electronic device that may be provided to the central server computer for initiating a transaction.

A second electronic device with a non-compliant machine readable code reader module scans the machine readable code associated with the product using a scanning device. The second electronic device is unable to recognize the machine readable code associated with the product and provides the unrecognizable additional information to the central server computer for decoding the unrecognizable additional information.

In one embodiment of the invention, the recognizable additional information comprises a product identifier, a product name, a product description, a quantity, a price, an indicator for whether a sale of the product is taxable, a time indicator for when the price is valid and a merchant identifier. In one embodiment, the recognizable additional information is parsed for the time indicator for when the price is valid and the tax indicator for whether a sale of the product is taxable and updated price and tax information is downloaded from the central server as necessary.

Another embodiment of the invention is directed to a central server computer comprising a processor, a computer readable medium coupled to the processor, and a network interface coupled to the processor. The network interface is configured to receive a first form comprising first recognizable additional data from a first electronic device. The first recognizable additional data is determined after the first scanning device in the first electronic device scans a machine readable code associated with a product, and also, the network interface is further configured to receive unrecognizable additional data from a second electronic device, and the unrecognizable additional data is determined after the second scanning device in the second electronic device scans the machine readable code associated with the product. The computer readable medium comprises a decoding module configured to decode the unrecognizable additional data to form second recognizable additional data into a second form.

Another embodiment of the invention is directed to a method comprising: receiving, by a central server computer, a first populated form comprising first recognizable additional data from a first electronic device, wherein the first recognizable additional data is determined after the first scanning device in the first electronic device scans a machine readable code associated with a first product. The method also comprises initiating, by the central server computer, a first transaction using the first populated form, and receiving, by the central server computer, unrecognizable additional data from a second electronic device, wherein the unrecognizable additional data is determined after the second scanning device in the second electronic device scans a second machine readable code, the second machine readable code associated with a second product. The central server computer comprises a decoding module configured to decode the unrecognizable additional data to form second recognizable additional data and insert the second recognizable additional data into a second form, and initiate a second transaction using the second form.

These and other embodiments of the invention are described in further detail below with reference to the Figures and the Detailed Description.

DETAILED DESCRIPTION

Figure 1:
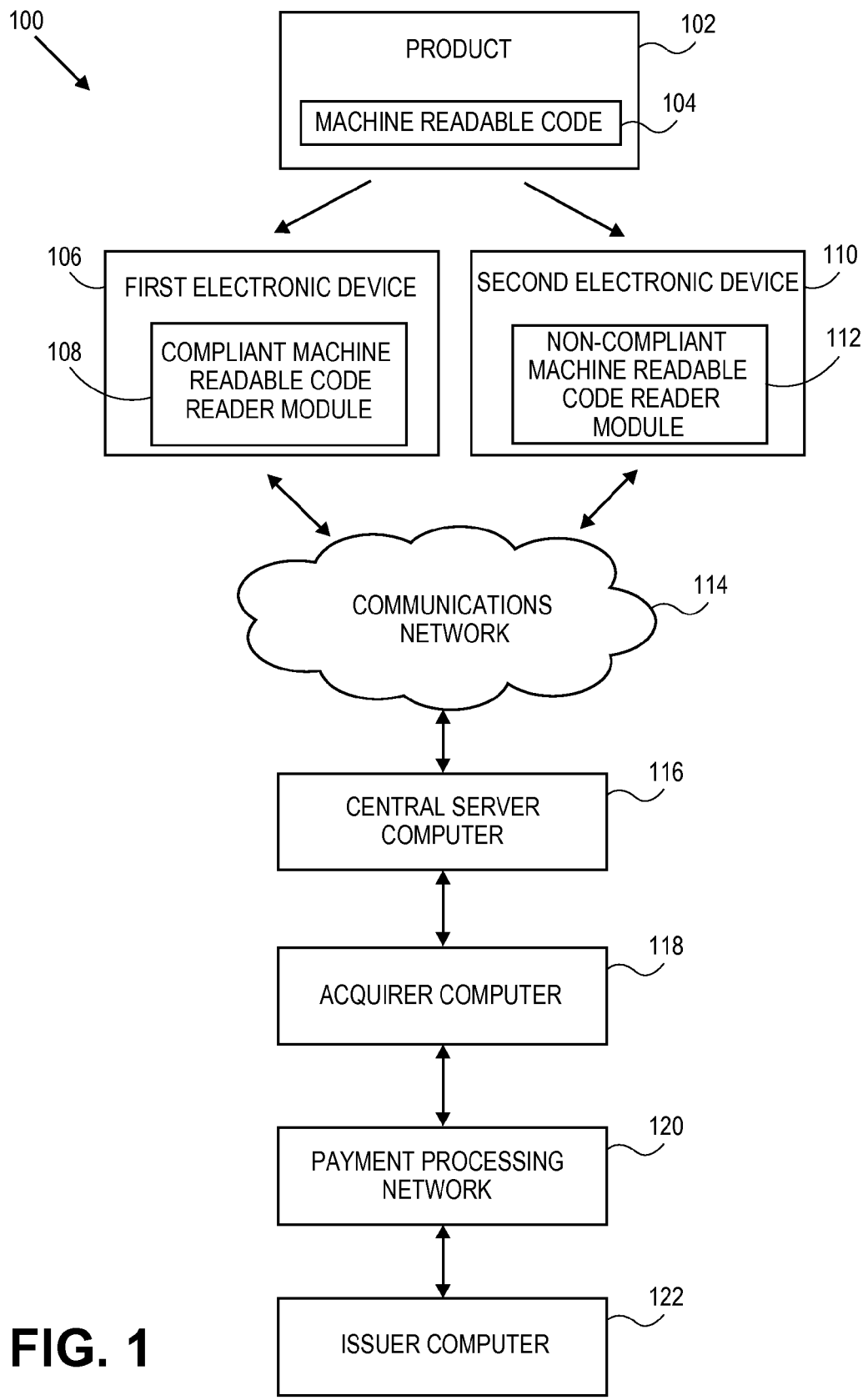
FIG. 1 shows a system in accordance with aspects of the invention.

Prior to discussing embodiments of the invention, description of some terms may be helpful in understanding embodiments of the invention.

A "machine readable code" may include any code that is readable by a machine, such as a computer. In some embodiments, the machine readable code may include bar codes to store information about a product or services. The information stored may include an address for a website (e.g., a URL) and/or encoded product information. In some embodiments, the encoded product information may include a combination of alphabetic and numeric characters. In some embodiments of the invention, the encoded information may have been encrypted using an encryption algorithm and a key for data confidentiality. Machine readable code may be scanned by an embedded camera within or associated with a user's electronic device (e.g., mobile device, personal computer, etc.) or a code reader for accessing information embedded within the code. Machine readable codes may be one-dimensional or two-dimensional. Some non-limiting examples of two dimensional machine readable code include DataMatrix, Maxicode and QR Code®. There may be different styles and formats of machine readable code, such as, rectangular, square, circular, black and white or multi-color.

A "compliant machine readable code reader module" may indicate a machine readable code reader module in a device that can recognize the data encoded in a machine readable code, such as a QR Code®. The data encoded in the machine readable code may have been encoded using an encoding scheme, such as Base64 encoding scheme. The encoded data may include information about a product or a service. In one embodiment, the encoded data includes a URL and information relating to a product, such as, product description, price, quantity, product identifier, merchant identifier, time indicator for the price, tax indicator, and any such product information.

A "non-compliant machine readable code reader module" may indicate a machine readable code reader module in a device that may not be able to recognize the data encoded in a barcode. An electronic device with a non-compliant machine readable code reader module may result in launching a web browser using a URL encoded in the machine readable code that will be directed to a website with additional information about the product.

"Decoded machine readable code data" may be machine readable code data that is obtained as a result of decoding a machine readable code. It may include a website address (e.g., http://purchase.authorize.net) and recognizable information about a product. Recognizable information about the product may include product description, price, product identifier, merchant identifier, quantity, etc., that may be used to populate a form on an electronic device so that a sale transaction of the product can be conducted using the electronic device without having to access a server computer for gaining additional product information.

A "scanning device" may include a camera that may be part of an electronic device, such as a mobile device that may be used for scanning machine readable codes. In some embodiments, scanning device is part of a smart phone or a tablet. In one embodiment, scanning device is a hand held device or a stationary device, such as a price scanner, capable of scanning a machine readable code associated with a product.

A "product" may include merchandise (grocery, electronics, personal items, household items, etc.) or a poster for advertisements or services (reservations, sales for events, etc.). A product may have a machine readable code (e.g., a QR Code®) associated with it that may include a URL for a website and the product information encoded in the code. A consumer with an electronic device may be able to scan the machine readable code associated with the product using a camera in the electronic device or communicatively coupled to the electronic device to get more information about the product and subsequently purchase the product using the electronic device.

A "form" may include an electronic document or page that can receive data. The data may include information about a product such as product description, product identifier, product name, quantity, price, merchandise identifier, etc. In some embodiments, populating a form on the electronic device indicates filling in the product information in the form using an application on the electronic device. In one embodiment, populating a form is done automatically, i.e., without human interaction, using the product information decoded from a machine readable code. Auto-populating the form with product information saves time and effort for a merchant of the product, since he does not have to enter the product information manually, and also for a consumer who is conducting a payment transaction of the product with the merchant, thus, resulting in a quicker transaction processing.

An "address" may indicate an Internet Protocol (IP) address or a domain name for a destination location for a URL. Domain names may be used in URLs to identify particular web pages. For example, the domain name visa.com or its IP address is the address for VISA's website. A URL may be part of a Uniform Resource Identifier (URI) used to identify a name or a resource over a network (e.g., a World Wide Web) using specific protocols, such as, Hypertext Transfer protocol (http or https). As an example, http://purchase.authorize.net/ represents a URL for domain name "authorize.net" by Cybersource.

A "host site" may include a website hosted by a server computer operated by a company or an organization. Information about different products and services offered by the company or organization may be stored in web pages on the host site that can be viewed using a web browser, such as, Internet Explorer, Firefox or Chrome.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

The term "client computer" may include any suitable computational apparatus. The client computer may be an apparatus operated by a consumer, a user associated with a merchant, or any other individual. The client computer may use any suitable wired or wireless network, including the Internet, in order to communicate with other systems. A merchant client computer may be used by a user associated with a merchant to interact with consumers who want to perform payment transactions using their mobile devices.

Embodiments of the invention are disclosed for purchasing merchandise using an electronic device, such as a mobile device, a tablet, or a personal computer with minimal hits to a server. In one embodiment, information about a product or services is encoded in a machine readable code that may be affixed to merchandise or a smart poster. A user can scan the machine readable code using an electronic device having a code reader comprising a scanner or a scanning device to access the information about the merchandise or services. Machine readable codes, such as, QR Codes® printed on smart posters may provide real time updates on special events, sales, transport options, restaurant reservations, etc.

In one embodiment, a machine readable code includes an Internet accessible URL having a domain name and an encoded data string with additional information related to a product that can be recognized by an electronic device having a compliant machine readable code reader module. Certain software applications can recognize that the encoded data string itself includes product information, such as, a product description, sale price, and applicable taxes. Those software applications can decode the encoded data string to form decoded machine readable code data comprising a URL and any recognizable additional information relating to the product. In some embodiments, the product information may not to be decrypted using an appropriate key to recover the recognizable additional information. The recognizable additional information relating to the product is used to auto-fill a form that is provided to a host site operated by a central server using the URL that can be used for purchasing the product using the electronic device.

An electronic device with a non-compliant machine readable code reader module may only recognize the URL but not the encoded data string with product information. The software application on such electronic devices can follow the URL to access the product information from a website associated with the URL. A consumer can then complete the product purchase using the links on the website.

Hence, embodiments of the invention allow a single (representation of) a trigger for a payment that works across different environments.

In one embodiment of the invention, a central server computer is configured to receive a populated form with a product information from a first electronic device using a network interface. The product information comprises a first recognizable additional data about the product that was determined by a compliant machine readable code reader module in the first electronic device. Further, the central server computer is configured to receive unrecognizable additional data from a second electronic device that was scanned by a non-compliant machine readable code reader module in the second electronic device. A decoding module in the central server computer is configured to decode the unrecognizable additional data to form second recognizable data into a second form.

Product information encoded in the encoded data string may include product description, sale price, quantity, taxable indications and any other information necessary for purchasing the product. In one embodiment of the invention, the product information includes data ranges during which the sale price is valid. For example, the price of an item or certain discount may be valid only for certain duration. The compliant software application would only check for an update of the price or the discount if the present date was outside the date range. Similarly, whether an item is taxable or not may depend upon whether the sale is going to be completed in certain jurisdiction. The software application may only query a server if the electronic device executing the application is outside the relevant jurisdiction. A consumer with a compatible device, i.e., running the compliant software application, can view the product information using their device without having to visit the linked URL.

Encoding information within a machine readable code about a product or services, in accordance with embodiments of the invention, minimizes or eliminates server hits for pricing data, taxable indications and other information necessary for a purchase transaction. This information may be auto-filled into a complaint software application without relying upon a network connection. Hence, using embodiments of the invention, bandwidth usage can be minimized to check up on any updated prices or validity of offers for every single purchase.

FIG. 1 shows a system 100 in accordance with aspects of the invention.

As illustrated in the figure, a product 102 having a machine readable code 104 can be scanned using a first electronic device 106 and/or a second electronic device 110. The first electronic device 106 and the second electronic device 110 are operable to communicate with a central sever computer 116 via a communications network 114 for a purchase transaction of the product 102 and receive additional information about the product 102, if needed. The central sever computer 116 is operable to communicate with an acquirer computer 118 that is further operable to communicate with an issuer computer 122 via a payment processing network 120 for authorization and completion of the purchase transaction.

Machine readable code 104 may be a two-dimensional barcode (e.g., a QR Code®) that can be read or scanned using a scanning device. A scanning device may be a camera in an electronic device or any device capable of reading the machine readable code. In some embodiments, the machine readable code 102 is affixed to, printed on or embedded in the product 102. In one embodiment, the machine readable code 104 is on a store display next to the product 102.

In one embodiment, the machine readable code 104 includes an address and an encoded data string relating to the information about the product 102. The address may be associated with a host site operated by the central server computer 116, for example, a URL for a website. In one embodiment, the machine readable code 104 includes an address and an encoded data string so that any software application capable of scanning the machine readable code associated with a product can access additional product information (either by accessing a website using the address or by decoding the encoded data string) for proceeding with the purchase of the product.

The first electronic device 106 includes a compliant machine readable code reader module 108 that is configured to scan the machine readable code 104 to get more information about the product 102. The compliant machine readable code reader module 108 is able to recognize the URL and the additional information about product 102 encoded in the machine readable code 104. In one embodiment, the recognizable additional information includes a product information, a product identifier, a price, a start and an end date during which the price is valid, information about whether the product is taxable, and a merchant identifier, etc.

The second mobile device 110 includes a non-compliant machine readable code reader module 112 that is able to scan the machine readable code 104 associated with the product 102. The non-compliant machine readable code reader module 110 may be able to recognize the address, i.e., a URL encoded in the machine readable code 104 but unable to recognize the product information encoded in the machine readable code 104. When the non-compliant machine readable code reader module 112 is unable to recognize the product information encoded in the machine readable code 104, the second electronic device 110 is directed to a website associated with the address so that the unrecognizable product information can be decoded into recognizable product information by the central server computer 116 operating the website for that address. A consumer using the second electronic device 110 can view the recognizable product information on the website and proceed with the purchase of the product 102 from the website.

The central server computer 116 may be a powerful computer or cluster of computers that is configured to receive a first form with recognizable product information from the first electronic device 106 and unrecognizable product information from the second electronic device 110 via communications network 114. The communications network 114 may be based on a wireless communication standard, such as WiMax or LTE (Long Term Evolution). The central server computer 116 is further configured to decode the unrecognizable product information into second recognizable product information that can be inserted into a second form. A first transaction may be initiated for the product 102 using the first form or a second transaction may be initiated for the product 102 using the second form by the central server computer 116.

Acquirer computer 118 is typically a system for an entity (e.g., a bank) that has a business relationship with a particular merchant or other entity. Acquirer computer 118 may route an authorization request for a purchase transaction of the product 102 (by first electronic device 106 and/or by second electronic device 110) to the issuer computer 122 via payment processing network 120. The payment processing network 120 may include data processing subsystems, networks, and operations used to support and deliver authorization services, and clearing and settlement services. An example of payment processing network 120 includes VisaNet®, operated by Visa®. The payment processing network 120 may include wired or wireless network, including the internet.

The issuer computer 122 is typically a business entity (e.g., a bank) that may have issued the credit/debit card used for the purchase. Some entities can perform both issuer computer 122 and acquirer computer 118 functions. The issuer computer 122 verifies the consumer's account and responds with an authorization response message to the acquirer computer 118 that may be forwarded to the appropriate electronic device. If the authorization is approved, the sale of the product 102 may be completed. A receipt may be generated with the transaction information, such as, production description and total charges.

Figure 2:
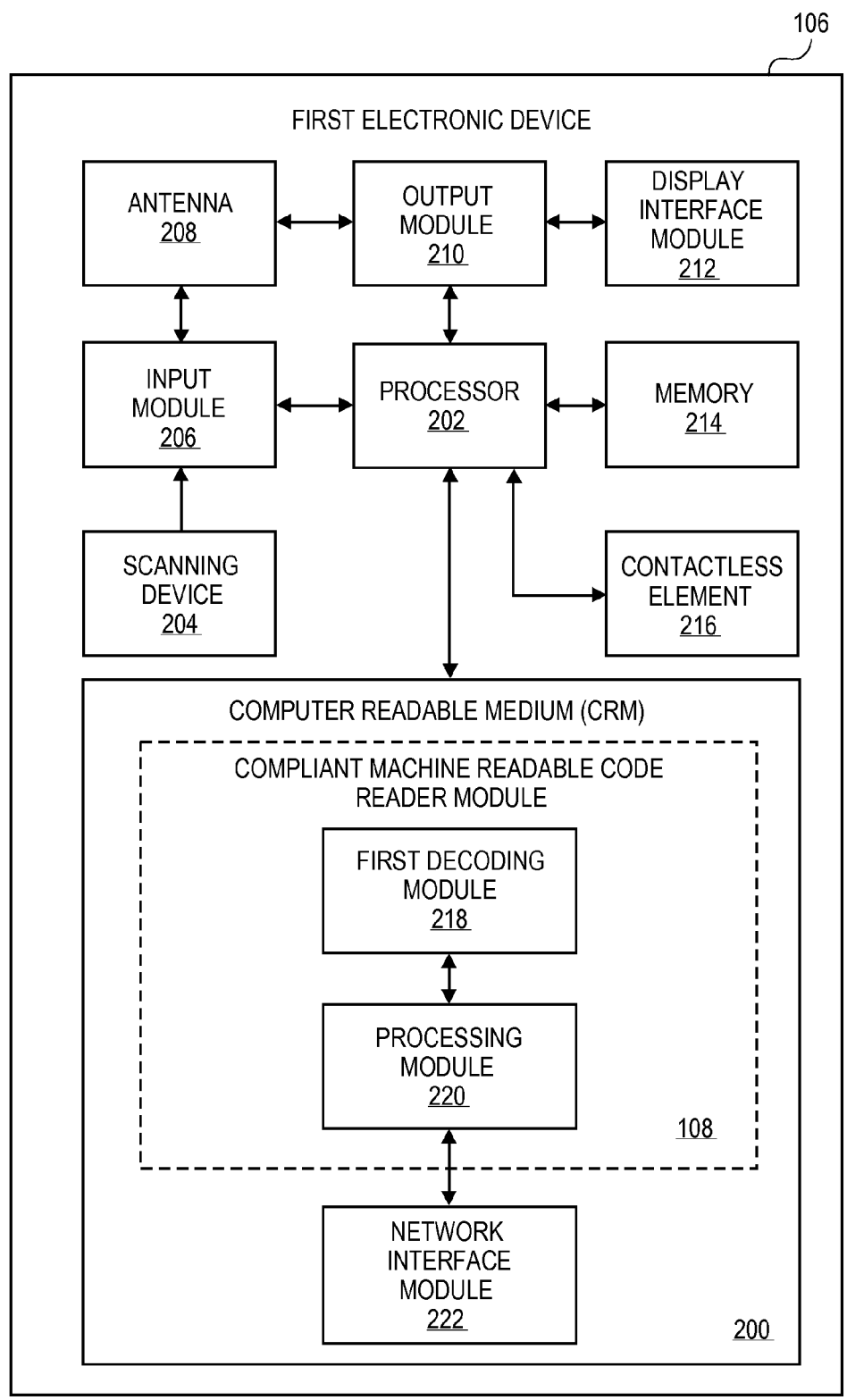
FIG. 2 illustrates certain elements of the first electronic device that may be used to implement an embodiment of the invention.

FIG. 2 illustrates certain elements of the first electronic device 106 that may be used to implement an embodiment of the invention. As illustrated, the first electronic device 106 may include a processor 202 or processing elements that execute instructions or code in order to implement methods, processes or operations. The first electronic device 106 may also include a scanning device 204, such as a camera. The scanning device 204 may be used for scanning machine readable codes, such as, the machine readable code 104 on the product 102. An antenna 208 may be used to transmit and receive signals, data or other information from the first electronic device 106. In one embodiment, the antenna 208 may communicate with the communications network 114 for exchanging data and other information for purchase transaction of the product 102.

An input module 206 may be configured to interface with various data input means such as a keypad, mouse, track ball, or touch screen. An output module 210 may be configured to interface with data output means such as a display screen or a speaker via a display interface module 212. A contactless element 216 may include a secure data storage element or a data transfer element. A memory 214 may be a non-volatile memory that can retain stored information when not powered, such as, Read Only Memory (ROM), Flash, or magnetic storage devices.

The first electronic device 106 may also include a Computer Readable Memory (CRM) 200 comprising code, executable by the processor 202 for implementing a method using a complaint machine readable code reader in one embodiment of the invention. The CRM 200 may include the compliant machine readable code reader module 108 and a network interface module 222. The compliant machine readable code reader module 108 may further include a first decoding module 218 and a processing module 220.

The compliant machine readable code reader module 108 may be configured to recognize a machine readable code that may have been scanned by the scanning device 204. In one embodiment, the compliant machine readable code reader module 108 may recognize that the product information was encoded using a Base64 encoding scheme and further encrypted using a particular encryption algorithm (e.g., DES, AES, RC5, RC6, etc.) that would need a particular key to decrypt the information.

The first decoding module 218 may be configured to receive machine readable code 104 and decode it to form decoded machine readable code data. In some embodiments, the decoding would involve decrypting the information using an appropriate key after decoding the relevant information in the machine readable code 104. In some embodiments, the decrypting and decoding may be performed by different modules. The decoded machine readable code data may comprise an address and recognizable additional information related to the product 102. In one embodiment, the recognizable additional information related to the product 102 may include the product description, product identifier, price, quantity, time indicator, tax indicator, merchant identifier, etc.

The processing module 220 may be configured to receive the decoded machine readable code data and populate a form using the recognizable additional information so that the product information is available to a user of the first electronic device 106 without having to access it from the central server computer 116. Hence, embodiments of the invention help minimize using a network connection for pricing data and other information necessary for a transaction.

In one embodiment of the invention, the time indicator included in the recognizable additional information is used to verify whether the price of the product is valid at the time of the purchase. The processing module 220 may parse the recognizable additional information for the time indicator and compare it with the present time. In one embodiment, the time indicator includes a date range, for example, a begin date and an end date when the price or a particular discount or an offer for the product is valid. In one embodiment, the time indicator includes an expiration date when a particular discount or offer expires. In one embodiment, the time difference due to different time zones is incorporated while comparing the time indicator with the present time. The processing module 220 may request to get an updated price of the product from the central server computer 116 if the price of the product is outside the date range or is expired. The processing module 220 may then use the updated price of the product for populating the form with the product information.

In one embodiment of the invention, the tax indicator included in the recognizable additional information is used to verify whether the product is taxable in a certain jurisdiction where the sale is going to be completed. The processing module 220 may parse the recognizable additional information for the tax indicator. A present geographic location of the first electronic device 106 may be determined using any of the standard location determination methods. One example of such method is by analyzing the signals from nearby cellphone towers, received using antenna 208, to approximately determine the location of the first electronic device 106. Another method includes receiving location signals from the satellites using a Global Positioning System (GPS). In certain examples, a combination of both of the methods may be used for location determination.

Once the present geographic location of the first electronic device 106 is determined, it is compared with the jurisdiction within which the product is taxable, as indicated by the tax indicator in the recognizable additional information. For example, an item many be subject to sales tax in the State of California, but not in the state of Oregon. If it is determined that the first electronic device 106 is outside the relevant jurisdiction, updated tax information for the present jurisdiction is downloaded from the central server computer 116. The processing module 220 may then use the updated tax information for calculating the total price of the product for populating the form.

The network interface module 222 may be configured to interface with the central server computer 116 using the communications network 114 for initiating a purchase transaction by providing the populated form using the address to a host site operated by the central server computer 116. For example, if the user decides to purchase the product 102 after viewing the product information in the populated form on a display screen, a "Purchase" or a "Buy" button on the display screen can be selected to initiate a purchase transaction. An authorization request for the purchase transaction is routed to the issuer computer 122 by the acquirer computer 118 for authorization. If the purchase transaction is authorized by the issuer computer 122, the central server computer 116 may receive an authorization response message from the acquirer computer 118 indicating that the transaction is complete. After receiving the transaction data from the acquirer computer 118, the processing module 220 can generate a receipt with the product information that can be displayed by the display interface module 212 on the display screen. Similarly, if the purchase transaction was rejected for some reason, the central server computer 116 may receive a response from the acquirer computer 118 that the transaction was rejected. A transaction incomplete message can be displayed by the display interface module 212 on the display screen after the data is received from the central server computer 116.

Figure 3:
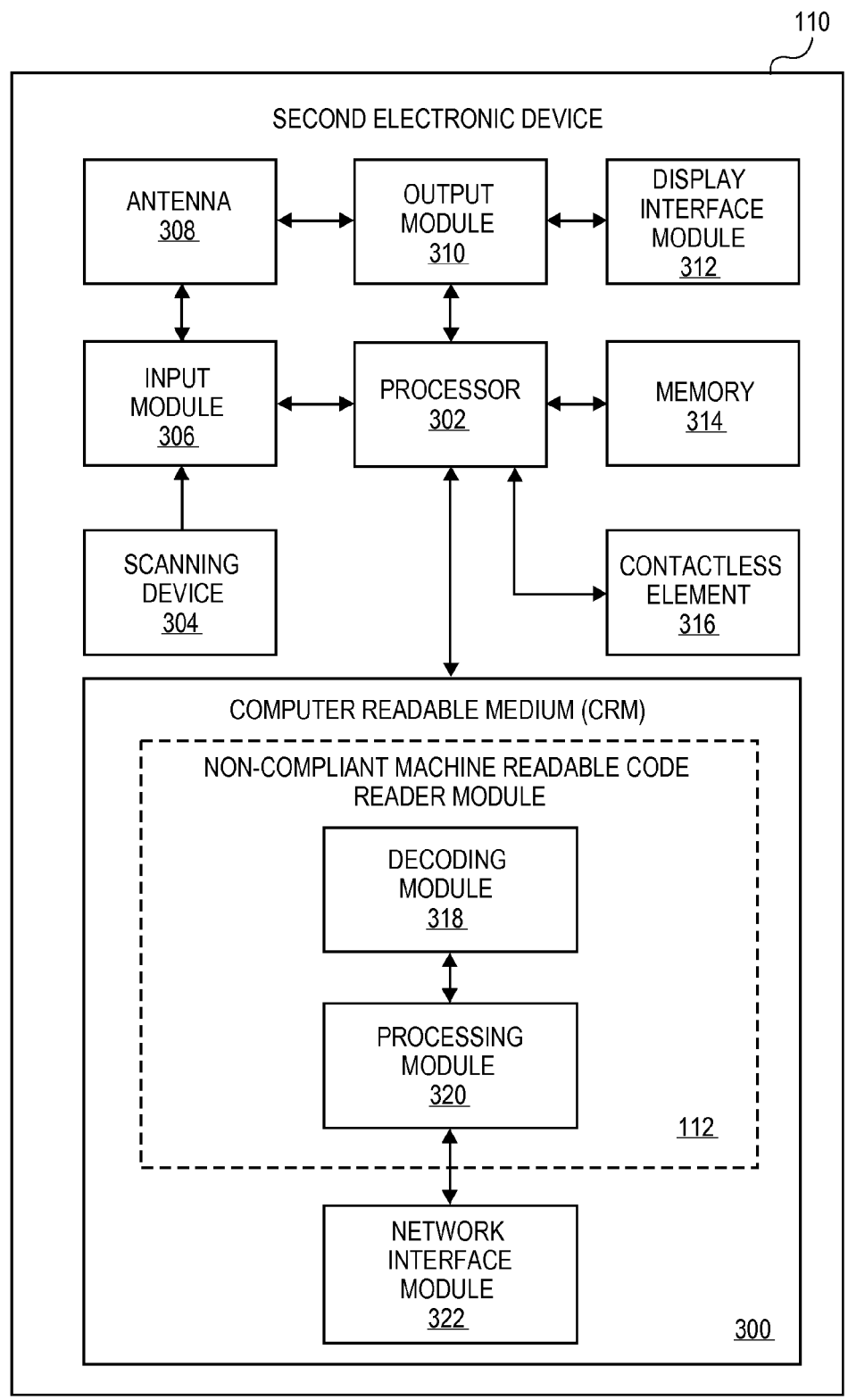
FIG. 3 illustrates certain elements of the second electronic device that may be used to implement an embodiment of the invention.

FIG. 3 illustrates certain elements of the second electronic device 110 that is similar to the first electronic device 106 except that a CRM 300 in the second electronic device 110 includes a non-compliant machine readable code reader module 112. The rest of the elements of the second electronic device 110 may be similar to their respective counterpart elements in the first electronic device 106. The non-compliant machine readable code reader module 112 may further include a decoding module 318 and a processing module 320.

The non-compliant machine readable code reader module 112 may be configured to read the machine readable code 104 that may be scanned by a scanning device 304. The non-compliant machine readable code reader module 112 may not be able to recognize the encoded product information in the machine readable code 104.

The decoding module 318 may be configured to receive machine readable code 104 and parse it into an address and unrecognizable product information. In one embodiment, the unrecognizable product information may include alphanumeric text from which product information may not be decoded by the decoding module 318. The address may be associated with a host site operated by the central server computer 116 having additional information about the product 102.

The processing module 320 may be configured to receive the address and unrecognizable product information which is provided to the central server computer 116 for decoding via the network interface module 322. A decoding module in the central server computer 110 may decode the unrecognizable product information into second recognizable additional information that may be populated into a second form at the address associated with the host site operated by the central server computer 110. The second recognizable additional information may include product description, price, quantity, product identifier, merchant identifier, etc. The host site may also include a shopping cart for purchasing the product and any other links such as product look up, product warranty, merchant information, terms and conditions, return policy, shipping rates, etc. If the user decides to buy the product using the links on the website, information about the transaction (e.g., complete or unsuccessful, electronic receipt, etc.) can be displayed using the display interface module 312 on a display screen.

Figure 4:
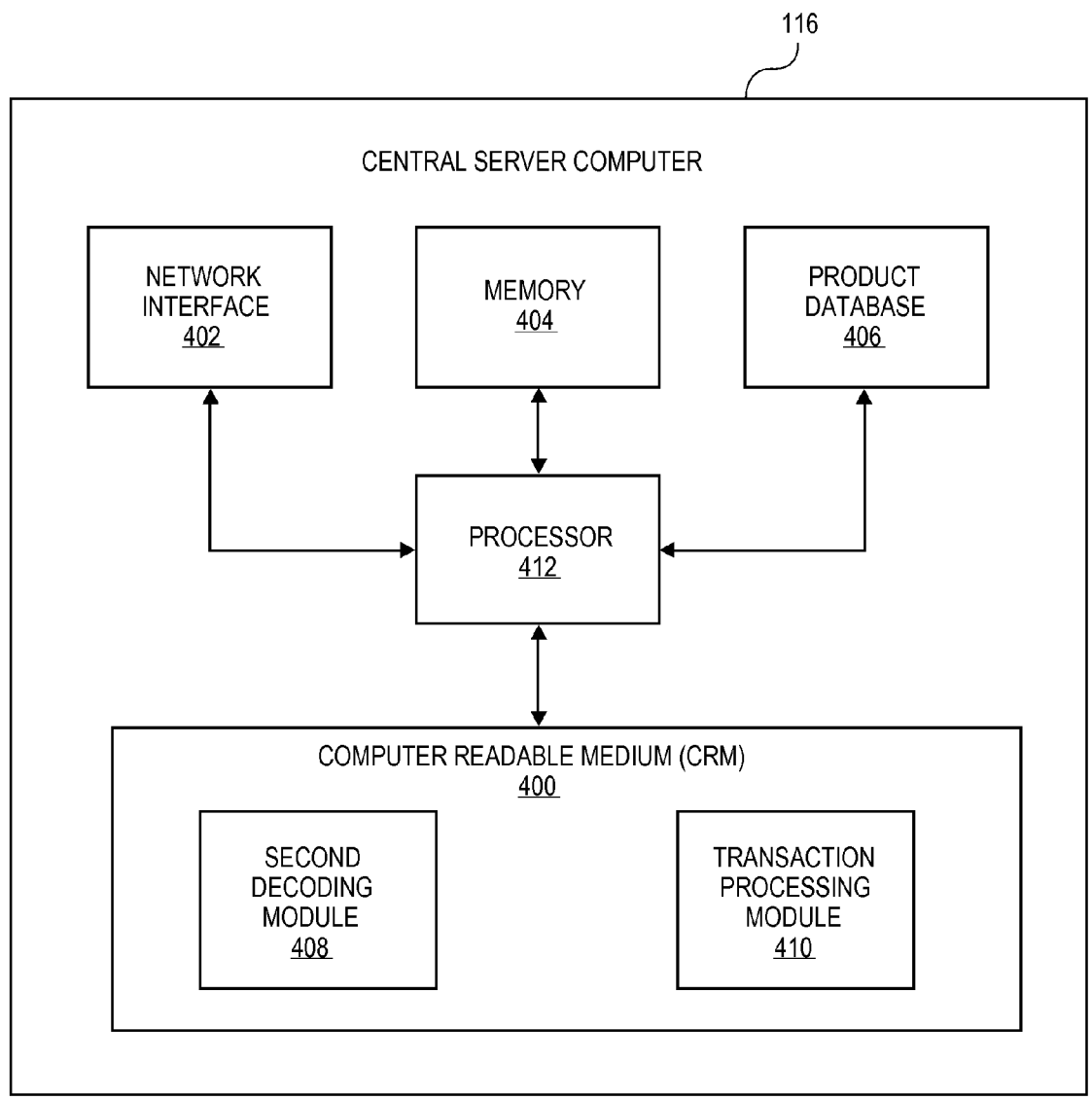
FIG. 4 illustrates certain elements of the central server computer that may be used to implement an embodiment of the invention.

FIG. 4 illustrates certain elements of the central server computer 116 that may be used to implement an embodiment of the invention. The central server computer 116 may be configured to provide web hosting services (e.g., cloud hosting) for various clients to make their websites accessible via the World Wide Web. As illustrated, the central server computer 116 may include a processor 412 or processing elements that execute instructions or code in order to implement methods, processes or operations. A network interface 402 is configured to communicate with the first electronic device 106 and the second electronic device 110 via the communications network 114 for accessing product information and processing purchase transactions. The network interface 402 is also configured to communicate with the acquirer computer 118 for transaction authorization and processing.

A CRM 400 may be a non-transitory computer readable storage medium, comprising code executable by the processor 412 for implementing embodiments of the invention. CRM 400 may include a second decoding module 408 and a transaction processing module 410. A memory 404 may be a non-volatile memory, such as, a ROM or magnetic disc storage. A product database 406 may include data and information about various products and services associated with various host sites operated by the central server computer 116.

The network interface 402 is configured to receive a first form comprising first recognizable additional data from the first electronic device 106. The first recognizable additional data populated in the first form may include product identifier, product description, quantity, price, merchant identifier, whether the product is taxable, and any such relevant information.

In one embodiment, the central server computer 116 is configured to receive a request for an updated price of the product, when the first electronic device 106 determines that the price of the product is not valid based on the time indicator for the price included in the first recognizable additional data. The processor 412 may then determine the updated price of the product, for example, by querying the product database 406, and provide it to the network interface 402, which further communicates it to the first electronic device 106. The first electronic device 106 uses the updated price for populating the form that may be displayed on the display screen for a user of the first electronic device 106.

In another embodiment, the central server computer 116 is configured to receive a request for an updated tax information for the product, when the first electronic device 106 determines that the present geographic location of the first electronic device is outside the jurisdiction for which the tax indicator in the first recognizable additional data is valid. The processor 412 may then determine the updated tax information for the product, for example, by querying the product database 406, and provide it to the network interface 402, which further communicates it to the first electronic device 106. The first electronic device 106 uses the updated tax information for calculating the total price of the product for populating the form that may be displayed on the display screen for the user of the first electronic device 106.

A first transaction using the first populated form may be initiated by the central server computer 116 for purchasing the product 102 using the first electronic device 106. The transaction processing module 410 may be configured to process the transaction by generating an authorization request message which is sent to the acquirer computer 118 and the issuer computer 122 via network interface 402 for authorization and completion of the transaction. Once the transaction is authorized, the user of the first electronic device 106 is informed that the transaction is complete. In one embodiment, a receipt may be generated by the first electronic device 106 including at least a portion of the first recognizable additional data, such as the product description and the price.

The network interface 402 is also configured to receive unrecognizable additional data from the second electronic device 110, wherein the unrecognizable additional data is determined after the scanning device 304 in the second electronic device 110 scans the machine readable code 104 associated with the product 102. The second decoding module 408 is configured to decode the unrecognizable additional data to form second recognizable additional data into a second form. In some embodiments, the second decoding module 408 is configured to decrypt the decoded information to form second recognizable additional data into a second form. The second form may be located on the host site (i.e., website) operated by the central server computer 116 at the address (i.e., URL) included in the machine readable code 104. In one embodiment, the second decoding module 408 uses the same decoding algorithm as used by the first decoding module 218.

The host site may include a shopping cart and other links for information about other products, shipping rates, terms and conditions, return policy, etc. A second transaction using the second form may be initiated by the central server computer 116 for purchasing the product 102, for example, by adding the product 102 to the shopping cart by the user of the second electronic device 110. The transaction processing module 410 may be configured to process the transaction in communication with the acquirer computer 118 and the issuer computer 122 via network interface 402 for authorization and completion of the transaction. Once the transaction is authorized, the user of the second electronic device 106 may be informed that the transaction is complete.

Figure 5:
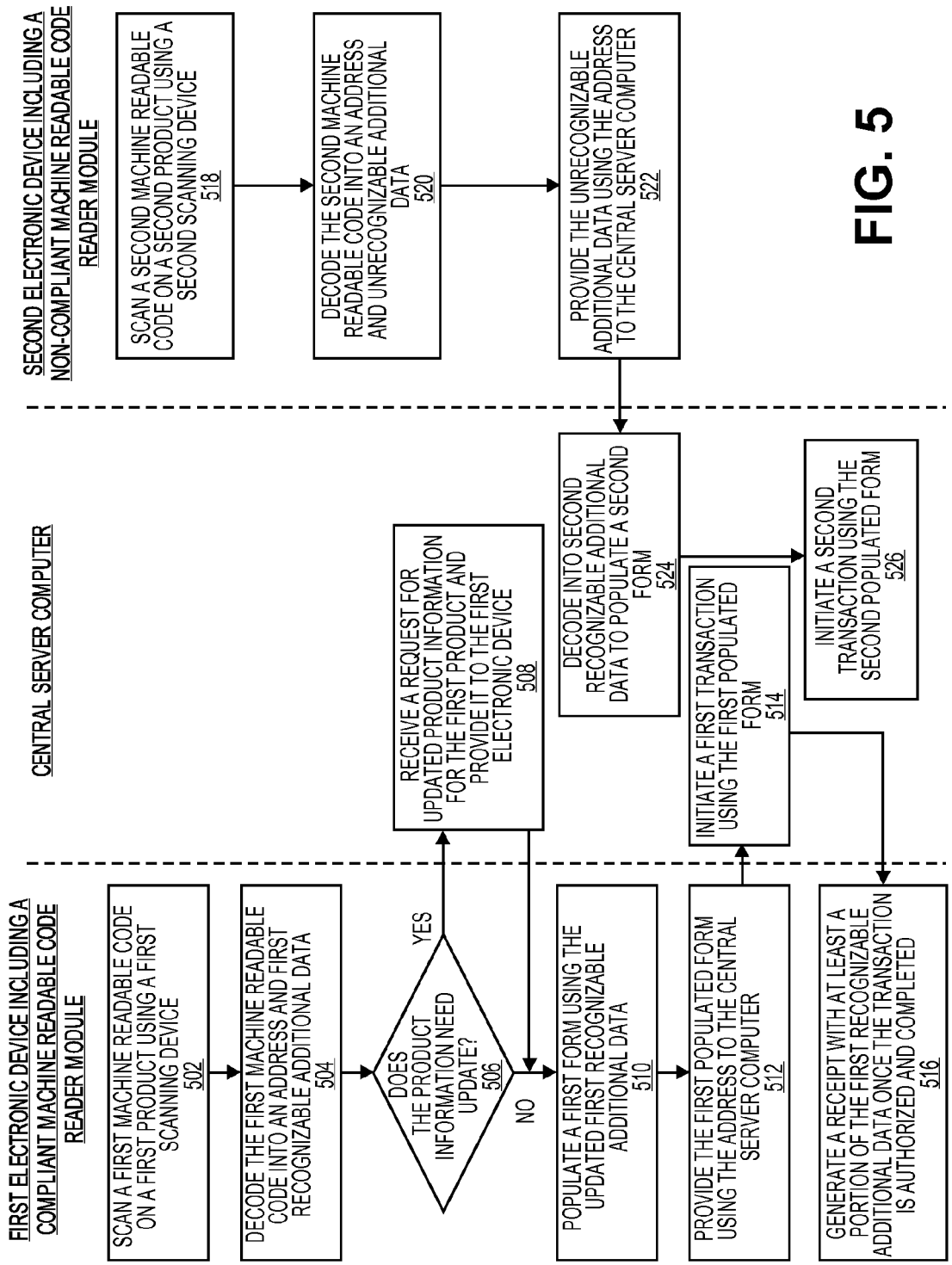
FIG. 5 illustrates an exemplary flow diagram, illustrating a method for performing embodiments of the invention using a compliant and a non-compliant application for machine readable code readers.

FIG. 5 illustrates an exemplary flow diagram, illustrating a method for performing embodiments of the invention using a compliant and a non-compliant application for barcode readers.

In step 502, a first electronic device having a compliant machine readable code reader module scans a first machine readable code associated with a first product using a first scanning device. In one embodiment, the first electronic device 106 having a compliant machine readable code reader module may scan the first machine readable code associated with the first product using the scanning device 204.

In step 504, the first machine readable code is decoded into decoded machine readable code data. In some embodiments, the decoding process may involve decrypting the decoded information using an appropriate key after decoding the relevant information. The decoded machine readable code data may comprise an address for a host site operated by the central server computer and first recognizable additional data relating to the first product. In one embodiment, the first machine readable code is the machine readable code 104 associated with the product 102 that is decoded by the first decoding module 218. The first recognizable additional data relating to the first product may include product information, a product identifier, a price, a time indicator for price, a tax indicator and a merchant identifier, etc.

In step 506, the product information is validated to determine whether updated product information needs to be downloaded from the central server computer. For example, the processing module 220 may determine that the price and tax information needs to be updated for the first product and may request the central server computer 116 for updated price and tax information. The method of determining and updating the price and tax information is further discussed with the help of FIG. 6.

In step 508, the central server computer receives a request for updated product information (e.g., price and/or tax information) for the first product. The central server may obtain the updated information from a product database, for example, product database 406, and provide the updated information to the first electronic device.

In step 510, the first recognizable additional data including the updated product information for the first product is used to populate a first form on the first electronic device. For example, the processing module 220 on the first electronic device 106 populates a form with the recognizable additional information about the product 102.

In step 512, the first electronic device provides the first populated form to the central server computer using the address associated with the host site for a transaction. In one embodiment, a user of the first electronic device selects a BUY button on a display screen of the first electronic device after viewing the populated form with the product information to initiate a purchase transaction.

In step 514, the central server computer initiates a transaction using the first populated form for a sale transaction of the first product. In one embodiment, the central server computer communicates with the acquirer computer 118 and the issuer computer 122 for authorization and completion of the transaction.

In step 516, the central server computer provides a message to the first electronic device that the authorization is approved and the transaction is completed. In one embodiment, the transaction processing module 410 provides a message to the first electronic device 106 using the network interface 402 for completion of the first transaction. The first electronic device may then generate a receipt with at least a portion of the first recognizable additional data, for example, the price and the product description. The user of the first electronic device can show the receipt (e.g., on a display screen of the first electronic device) to a cashier of the merchant, where the first product was sold, thus by-passing the checkout line.

In step 518, a second electronic device having a non-compliant machine readable code reader module scans a second machine readable code associated with a second product using a second scanning device. In one embodiment, the second electronic device 110 having a non-compliant machine readable code reader module may scan the second machine readable code associated with the second product using the scanning device 304.

In step 520, the second machine readable code associated with the second product is decoded into an address and unrecognizable additional data. In one embodiment, the address is a URL for a website hosted by the central server computer.

In step 522, the unrecognizable additional data is provided to the central server computer using the address, i.e., a web browser on the second electronic device may launch the website using the URL.

In step 524, the unrecognizable additional data is decoded by the central server computer to determine second recognizable additional data that is inserted into a second form. In one embodiment, the second decoding module 408 in the central server computer 116 decodes the unrecognizable additional data into second recognizable additional data that is displayed as a second form on the website linked by the URL. In one embodiment, a shopping cart may also be displayed on the website to which the second product may be added to initiate a sale transaction. In one embodiment, there may be additional links for related information on the website.

In step 526, the central server computer initiates a second transaction using the second form. In one embodiment, the central server computer communicates with the acquirer computer 118 and the issuer computer 122 for authorization and completion of the transaction.

Figure 6:
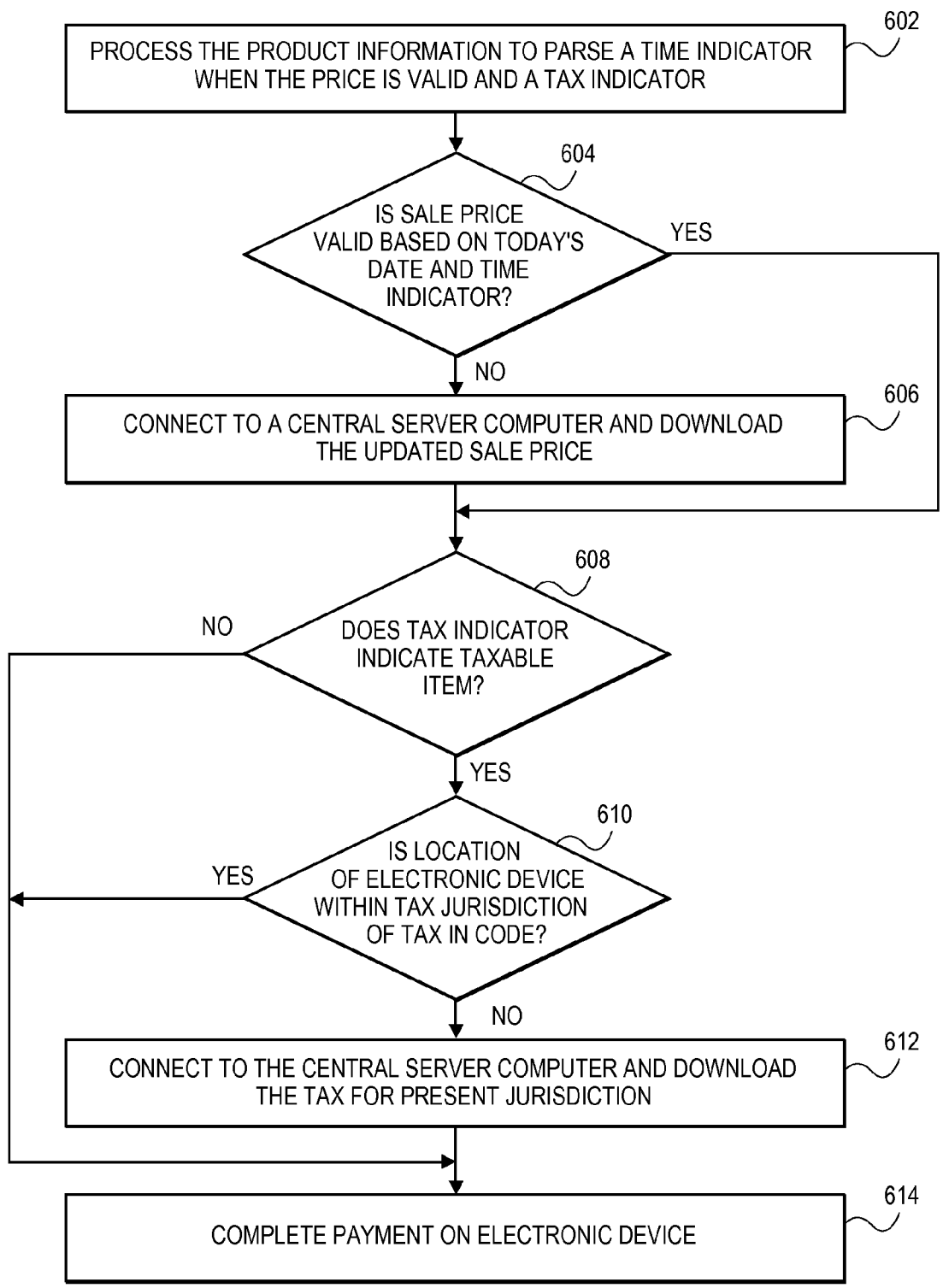
FIG. 6 illustrates an exemplary flow diagram, illustrating a method for performing embodiments of the invention for determining and updating price and tax information encoded in a machine readable code.

FIG. 6 illustrates an exemplary flow diagram, illustrating a method for performing embodiments of the invention for determining and updating price and tax information encoded in a machine readable code. Note that the exemplary embodiment describes updates to price and tax for illustrative purpose only; however, any relevant information related to the product may be updated using embodiments of the invention.

In step 602, information about a product is processed to parse a time indicator for a price of the product and a tax indicator for whether the product is taxable. In one embodiment, product information is recognizable additional information relating to the product, decoded from a machine readable code associated with the product by a decoding module in an electronic device, as a result of scanning the machine readable code using a scanning device in the electronic device. Decoding the machine readable code associated with the product by the decoding module in the electronic device also provides an address of a website, hosted by a central server computer. In one embodiment, the information about the product includes product description, a price, a product identifier, a time indicator for the price, a tax indicator, and a merchant identifier.

In step 604, the present date is determined and compared with the time indicator. The present date may be today's date or the date on which the product is scanned. In one embodiment, the time indicator may include a date range during which the price of the product is valid, such as a start date and an end date (for example, Nov. 1, 2012 and Nov. 15, 2012). In one embodiment, the time indicator may include an expiration date after which the price of the product is not valid (for example, Nov. 15, 2012). The price may be a discounted price (e.g., 25% off) or a special offer (e.g., buy one get one free). In one embodiment, a time zone difference is compensated for while comparing today's date with the time indicator. For example, if the date range was specified in Eastern Time zone (ET) and the present date was determined using Pacific Time zone (PT), the difference is accounted for while comparing the time indicator with the present date.

In step 606, if it is determined that the price of the product included in the product information is not valid (i.e., outside the date range or present date is later than the expiration date), an updated price is downloaded from the central server computer. If the price of the product is valid based on the comparison, no update from the server is necessary. In some embodiments, an updated time indicator is also downloaded from the central server computer along with the updated price. For example, if the end date or the expiration date of the offer has moved up, it is reflected in the product information. In one embodiment, the central server computer communicates with a product database, such as product database 406, to get updated information about the price of the product.

In step 608, it is determined from the tax indicator whether the product is taxable or not. For example, most of the household items (e.g., electronics, furniture) are taxable while certain dairy products, such as milk and cheese are not taxable for retail sales tax. If the product is not taxable as indicated by the tax indicator, the transaction may proceed for authorization.

In step 610, location of the electronic device is determined to check whether the tax indicator is valid within the specified jurisdiction. For example, an item may be taxable in the State of California, but not in the state of Oregon. A present geographic location of the electronic device may be determined using any of the standard location determination methods, for example, by analyzing the signals from nearby cellphone towers or GPS or combination of both. If the location of the electronic device is within tax jurisdiction as specified in the product information then there is no update necessary from the server.

In step 612, if it is determined that the location of the electronic device is outside the tax jurisdiction specified in the product information, updated tax information for the present jurisdiction is downloaded from the central server computer. For example, a user purchasing a camera in the State of Oregon does not need to pay sales tax on the camera even though the taxable indicator specifies a default sales tax.

In step 614, updated information along with the additional recognizable information for the product is populated in a form on the electronic device and provided to the central server computer for initiating a purchase transaction of the product. The central server computer may initiate an authorization request for the transaction and complete the transaction on the electronic device.

Figure 7A:
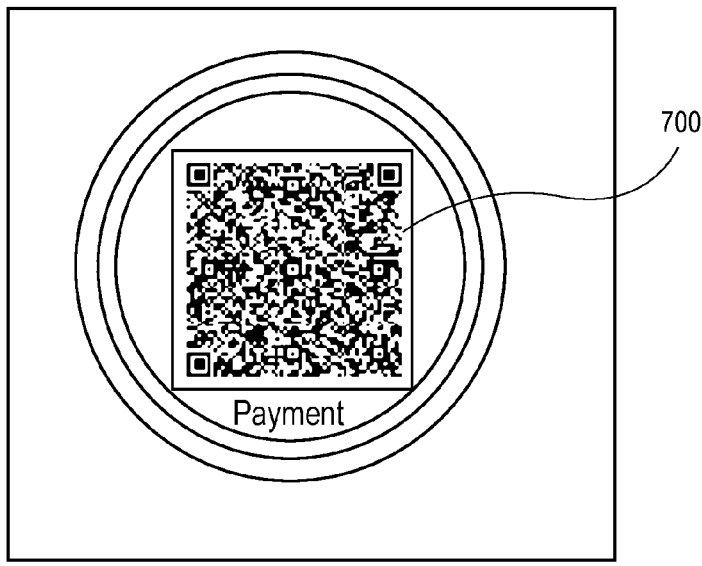
FIG. 7A illustrates an exemplary embodiment of a machine readable code.

FIG. 7A illustrates an exemplary embodiment of a machine readable code 700.

The machine readable code 700 may comprise an address of a website (e.g., a URL) and encoded information about a product it is associated with. The encoded product information may include a product description, a product identifier, a price, a time indicator for the price, a tax indicator, a merchant identifier, quantity, etc. An example of such machine readable code is a two dimensional QR CODE®. The machine readable code 700 is illustrated as a square for illustrative purposes only, however, any style and format, such as, rectangular, circular, black and white or multi-color, which is capable of storing a certain number of encoded characters may be used. In one embodiment, the machine readable code 700 is encoded using a Base64 encoding scheme. In some embodiments, the relevant product information is encrypted and encoded for obfuscating the sensitive information.

A QR Code® may be made of a number of squares or modules. Some of those squares must not be covered or edited for the QR Code® to work correctly. The three large squares are the position markers which indicate the scanner where the edges of the code are. One or more smaller square are the alignment markers that act as reference points for the scanner. In some cases, alternating black and white modules are the timing patterns that define the positioning of the rows and columns. Some sections of the code define the format, i.e., they indicate to the scanner whether it is a website (URL), a text message, numbers, Chinese symbols or the combination thereof. In some cases, a version number is marked by some of the modules. The amount of data that can be stored in a QR Code® depends on the input character set, version and the error correction level. As an example, up to 4296 alphanumeric characters may be stored in one QR Code®. All QR Code® are created with built-in error correction algorithms that allow them to be scanned even if few bytes are missing, edited or covered. However, the storage capacity goes down with higher error correction level. The number of bytes that can be edited may be based on the version number. In some embodiments, a visible design may be embedded in the QR Code® utilizing the error correction algorithms to imply a seal of certification.

Figure 7B:
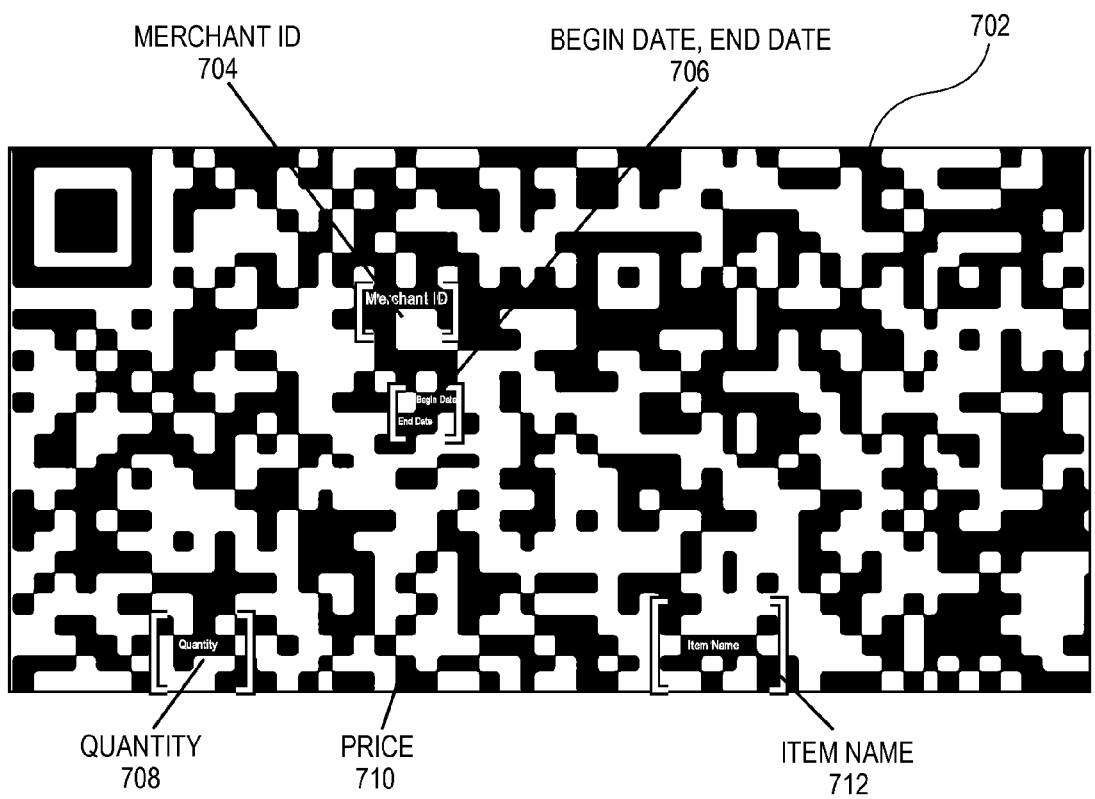
FIG. 7B illustrates an exemplary closer view of the machine readable code.

FIG. 7B illustrates an exemplary closer view 702 of the machine readable code 700. As illustrated in the figure, the machine readable code 700 comprises of a merchant ID 704, a begin and end date 706, a quantity 708, a price 710 and an item name 712. The begin and end date indicate the date range during which the price of the item is valid. In an example, a price $18.95 for a set of golf balls may be valid between Jul. 1, 2012 and Jul. 15, 2012. Similarly, a taxable indicator set to "Yes" indicates that the sale of the golf balls is taxable. However, the tax indicator may be valid only in certain jurisdictions. For example, if the sale is completed in the State of California, the sale of the golf balls may be taxed, however, if the sale is completed in the State of Oregon, the sale of the golf balls may not be taxed.

Figure 8:
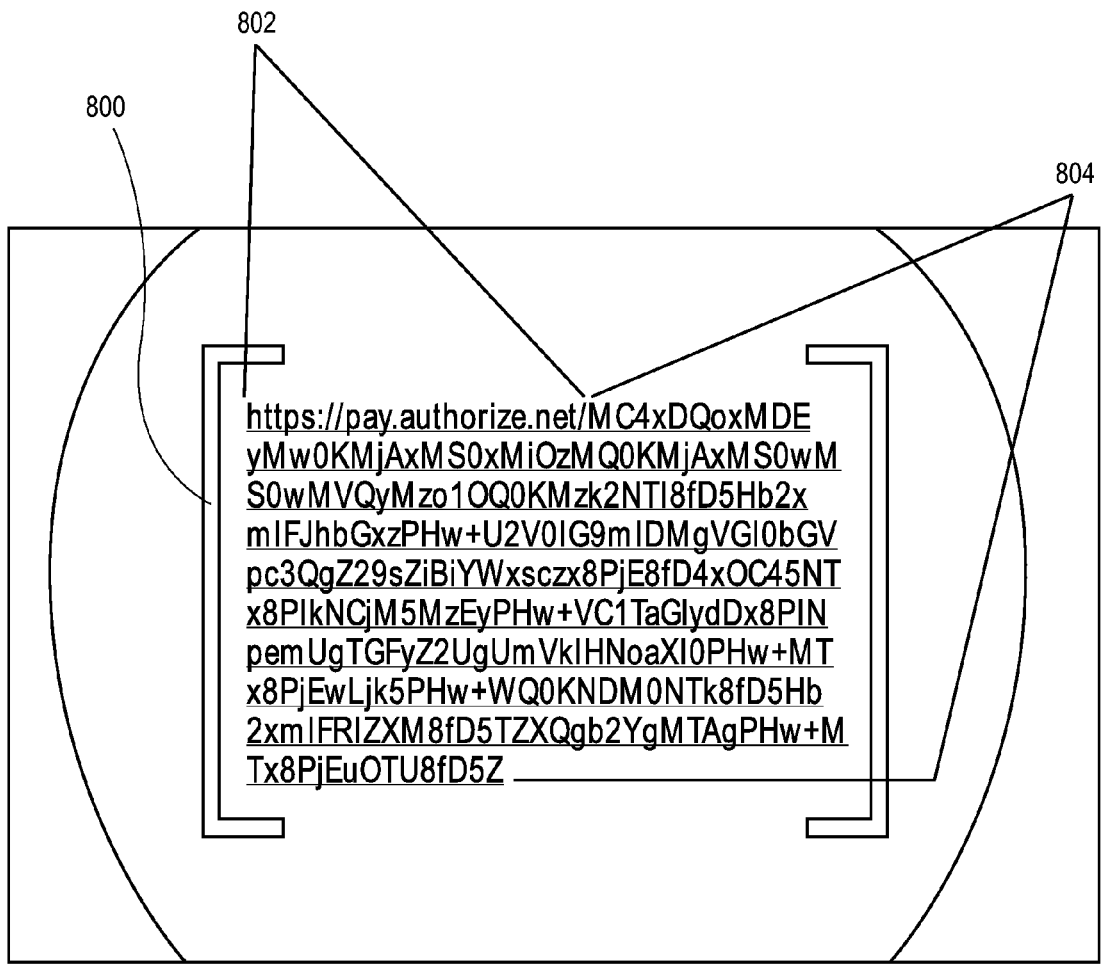
FIG. 8 illustrates an exemplary decoded machine readable code data in one embodiment of the invention.

FIG. 8 illustrates an exemplary decoded machine readable code data 800. The exemplary decoded machine readable code data 800 may have been determined as a result of scanning the machine readable code 700 using a complaint machine readable code reader module 108 by the first electronic device 106. The decode machine readable code data may comprise an address 802 and an encoded product information 804. As illustrated, the address 802 indicates a website address http://pay.authorize.net/. The encoded product information 804 comprises product information, as illustrated in FIG. 7A. In one embodiment, the decoded machine readable code data 800 is decoded by the first decoding module 218 to provide recognizable additional information relating to the product. The recognizable additional information may be used to populate a form on the first electronic device 106 without downloading the product information from a server. The populated form may be provided to the central server computer 116 by the first electronic device 106 for initiating a purchase transaction of a product to which the machine readable code 700 is attached to.

Figure 9:
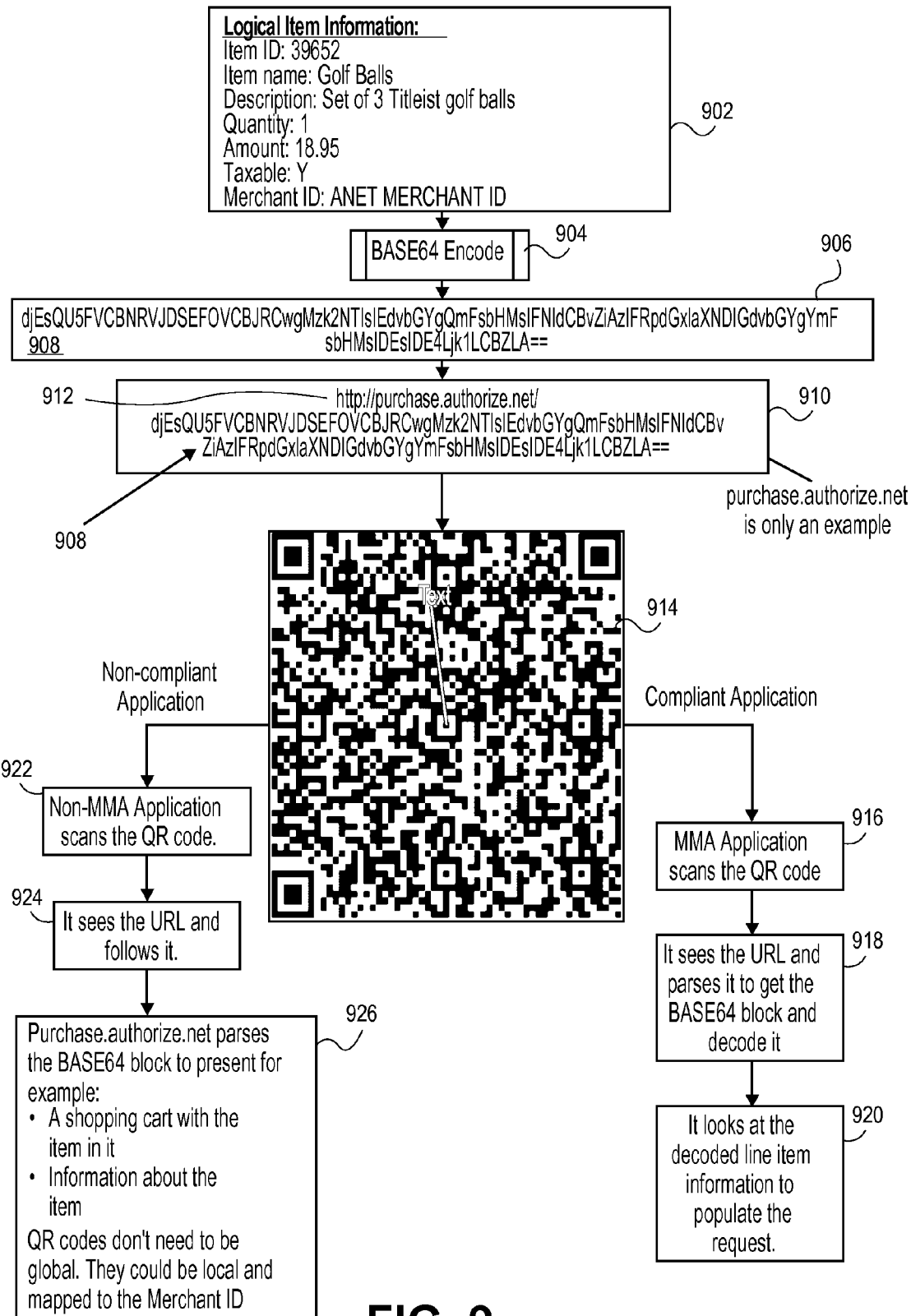
FIG. 9 illustrates an exemplary flow diagram, illustrating a method for performing embodiments of the invention for accessing product information encoded in a machine readable code.

FIG. 9 illustrates an exemplary flow diagram, illustrating a method for performing embodiments of the invention for accessing product information encoded in a machine readable code.

In step 902, a logical item information is illustrated. The information includes item ID, item name, description, quantity, amount, taxable and merchant ID. In some embodiments, the logical item information may include a date range or an expiration date during which the amount of the item is valid.

In step 904, the logical item information is encoded using a Base64 encoding mechanism. In some embodiments, the logical item information is encrypted using any suitable encryption algorithm (e.g., RC6, blowfish, AES, etc.) before encoding the information. By encrypting the information ensures that only the intended recipient with the appropriate key may be able to decrypt the relevant information. Base64 encoding takes binary data in an ASCII string format and translates it into a radix-64 representation. In this embodiment Base64 encoding is used, however, any encoding mechanism that provides a safe transmission of data over a communication network may be used. In one embodiment, Base64 encoding takes the data to be encoded in a particular format. In some embodiments, a combination of numeric characters [0-9] and alphabets [A-Z, a-z] is used as a character set for encoding. In some embodiments, one or more padding bytes (e.g., "=") may be appended to the encoded data.

In step 906, an encoded item information 908 is illustrated. In this example, the encoded item information 908 is the logical item information specified in step 906 that has been encoded using a Base64 encoding mechanism.

In step 910, the encoded item information 908 is appended to a URL 912 to generate a QR CODE® 914. In this example, URL 912 is http://purchase.authorize.net, however, any URL identifying a location of a resource on a network, such as a web page, related to the information about the item or the sale of the item may be specified. As illustrated, the QR CODE® 914 comprises URL 912 and the encoded item information 908. Note that in this example, a QR CODE® is illustrated; however, any machine readable code capable of storing a URL and an encoded item information may be used.

QR CODE® 914 may be scanned using a compliant application that may recognize the encoded item information 908 or a non-compliant application that may not recognize the encoded item information 908. Referring back to FIG. 1, a compliant application may be an application on the first electronic device 106 having the compliant machine readable code reader module 108 and a non-compliant application may be an application on the second electronic device 110 having the non-compliant machine readable code reader module 112.

Following the complaint application path, in step 916, a compliant application, e.g., a Mobile Marketing Acceptance (MMA) application, scans the QR CODE® 914. The QR CODE® 914 may be scanned using a scanning device, for example, scanning device 204 in the first electronic device 106.

In step 918, the compliant application parses the QR CODE® 914 into URL 912 and the encoded item information 908 and decodes the encoded item information 908. Referring back to FIG. 2, QR CODE® 914 may be decoded by the first decoding module 218. The compliant application is able to recognize that the encoded item information 908 was encoded using a Base64 encoding mechanism and decodes it accordingly. If the encoded item information 908 was encrypted, the decoded data may need to be decrypted using the appropriate key to generate the decoded item information, which may be similar to the logical item information in step 902.

In step 920, the decoded item information is used to populate a form on the electronic device that was used for scanning the item. Referring back to FIG. 2, the processing module 220 may take the decoded/decrypted item information and populate a form on the first electronic device 106 that can be displayed on a display screen using the display interface module 212. The populated form may comprise the logical item information, as specified in the step 902, and some other information necessary for purchasing the item. The compliant application on the electronic device may prepare an authorization request for a purchase transaction of the item using the populated form and communicate with a server for authorization and completion of the purchase transaction. A user of the electronic device may be able to complete the purchase of the item using the electronic device.

Following the non-complaint application path, in step 922, a non-compliant application, e.g., a non-MMA application, scans the QR CODE® 914. The QR CODE® 914 may be scanned using a scanning device, for example, scanning device 304 in the second electronic device 110.

In step 924, the non-compliant application parses the QR CODE® 914 into URL 912 and the encoded item information 908. Referring back to FIG. 3, the decoding module 318 may be able to recognize the URL 912 but may not be able to recognize the encoded item information 908. The non-compliant application may then direct a web browser on the electronic device to the URL 912 to get more information about the item or to initiate a purchase of the item. In one embodiment, the URL 912 points to the website (http://purchase.authorize.net) that may be hosted by the central server computer 116.

In step 926, the encoded item information 908 is decoded to present the item information on the website pointed to by the URL 912 along with some information about purchasing the item. As an example, the encoded item information 908 may be decoded by the second decoding module 408 on the central server computer 116. In one embodiment, decoding by the compliant application (e.g., by the first decoding module 218) and by the central server computer (e.g., by the second decoding module 408) are performed using the same decoding algorithm such that the decoded item information on the electronic device and the website pointed to by the URL 912 are similar. If the encoded information was encrypted, the second decoding module 408 decrypts the decoded information using the appropriate key to recover the item information.

The website pointed to by the URL 912 may display a shopping cart including the item for initiating a purchase transaction and some other links related to the item and the merchant. The other links may include information about related items (for example, golf clubs, golf shoes and such), shipping policy, merchant information, return policy, terms and conditions, etc. A user of the electronic device who scanned the item with the non-compliant application may then complete the purchase of the item using the links on the website (e.g., http://purchase.authorize.net).

Figure 10:
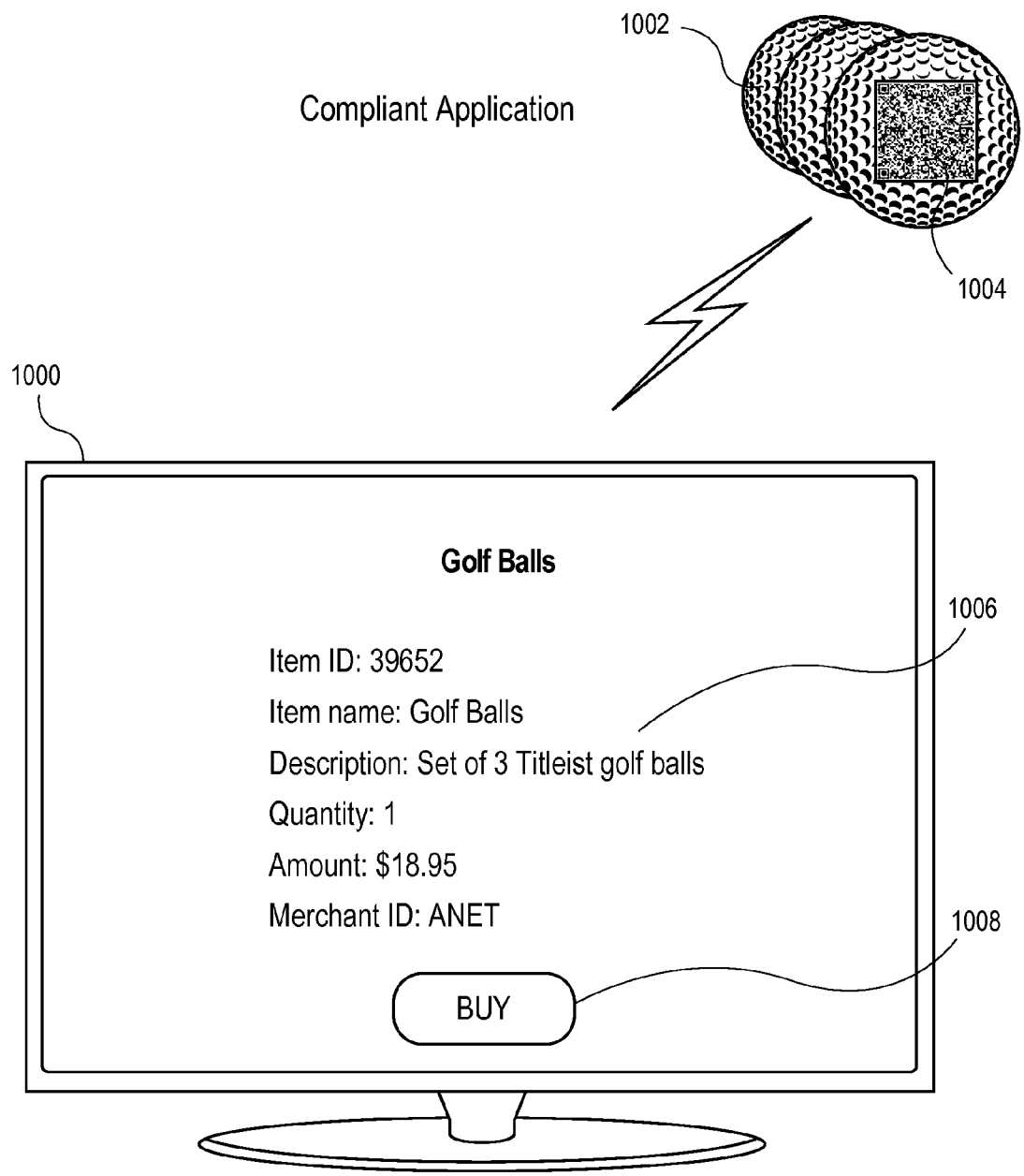
FIG. 10 illustrates an exemplary first electronic device scanning a machine readable code associated with a set of golf balls in one embodiment of the invention.

FIG. 10 illustrates an exemplary electronic device 1000 scanning a machine readable code 1004 associated with a set of golf balls 1002 using a scanning device (not shown). The scanning device may be within the electronic device 1000 or it may be communicatively coupled to the electronic device 1000. In one embodiment, the electronic device 1000 is similar to the first electronic device 106 having the compliant machine readable code reader module 108 operable to scan the machine readable code 1004 using the scanning device 204.

As a result of scanning, the machine readable code 1004 is decoded by a compliant application executing on the electronic device 1000 and the resulting recognizable additional information 1006 is displayed on the display screen of the electronic device 1000. In one embodiment, the information about the set of golf balls 1002 was encoded in the machine readable code 1004 using a Base64 encoding scheme that was decoded using a decoding module in the electronic device 1000. In some embodiments, if the decoded information needs to be decrypted using a decryption algorithm and a key to recover the recognizable additional information.

As illustrated in FIG. 10, the recognizable additional information 1006 includes an item ID, an item name, a description, a quantity, an amount and a merchant ID. Note that the amount may be updated price with the sales tax (if applicable). A BUY link 1008 on the display screen, if selected, will direct the complaint application to a URL (e.g., http://purchase.authorize.net) where the purchase of the item may be completed.

Figure 11:
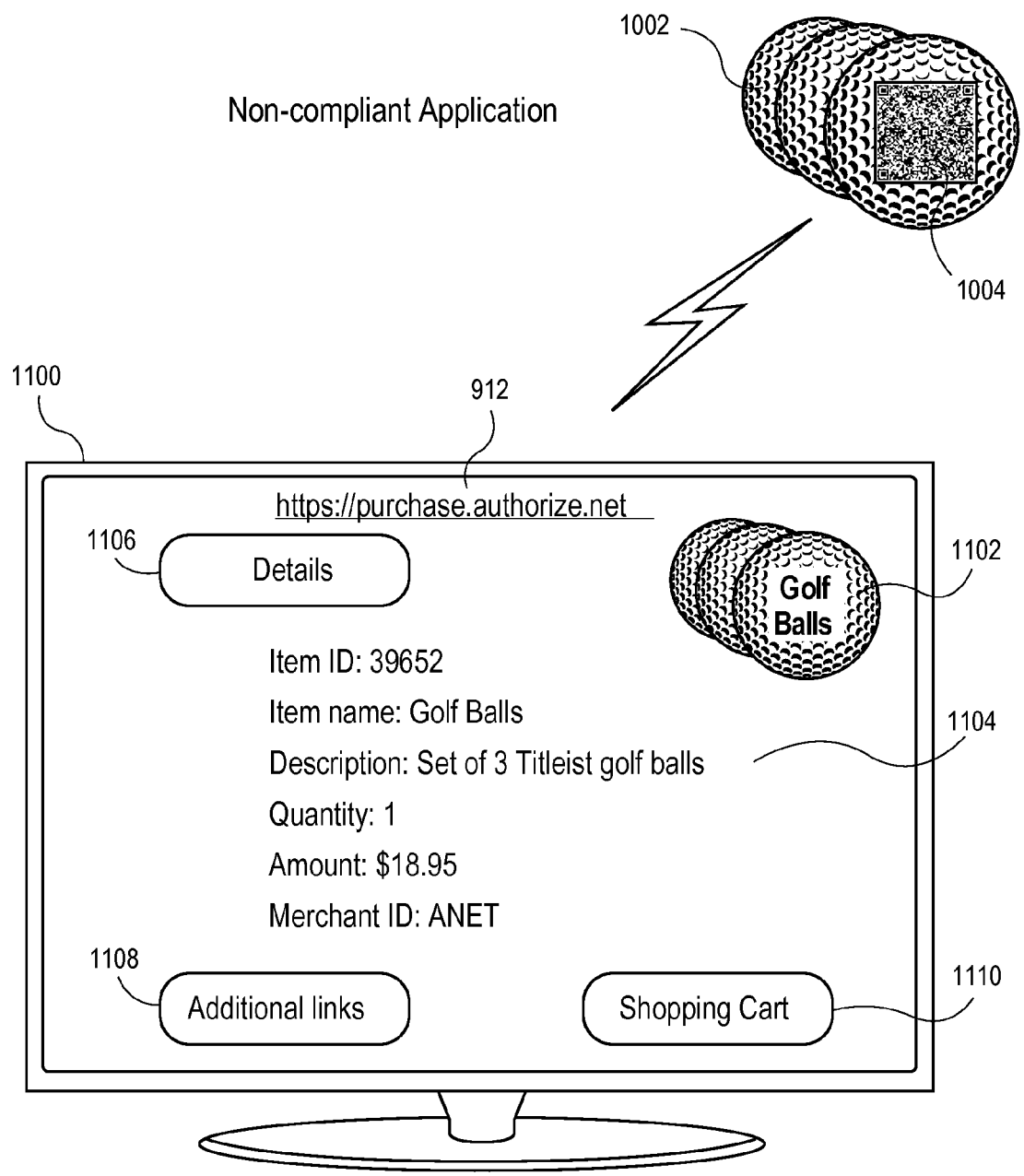
FIG. 11 illustrates an exemplary second electronic device scanning the machine readable code associated with the set of golf balls in one embodiment of the invention.

FIG. 11 illustrates an exemplary electronic device 1100 scanning the machine readable code 1004 associated with the set of golf balls 1002 using a scanning device (not shown). The scanning device may be within the electronic device 1100 or it may be communicatively coupled to the electronic device 1100. In one embodiment, the electronic device 1100 is similar to the second electronic device 110 having the non-compliant machine readable code reader module 112 operable to scan the machine readable code 1004 using the scanning device 304.

As a result of scanning, the machine readable code 1004 is parsed by a non-compliant application executing on the electronic device 1100, resulting in the URL 912 and unrecognizable additional information about the golf balls. Since the non-compliant application executing on the electronic device 1100 is unable to decode the encoded information about the golf balls, it launches a web browser using the URL 912 specified in the machine readable code 1004.

The unrecognizable additional information is decoded by a server in to recognizable additional information about the golf balls and displayed on a web page pointed to by the URL 912 (e.g., http://purchase.authorize.net). As illustrated in FIG. 11, the web page at the URL 912 may display a picture 1102 of the golf balls, recognizable additional information 1104 about the golf balls, a details link 1106, additional links 1108 and a shopping cart link 1110. The recognizable additional information 1104 may include an item ID, an item name, a description, a quantity, an amount and a merchant ID. The details link 1106 may direct the user to another webpage with more information about the item and the merchant, terms and conditions, return and shipping policies, etc. The details link 1108 may direct the user to other web pages or websites with information about related products and services (e.g., golf sets, golf shoes, nearest golf courses, etc.). The shopping cart link 1110 may direct the user to proceed with the purchase of the item(s).

Figure 12:
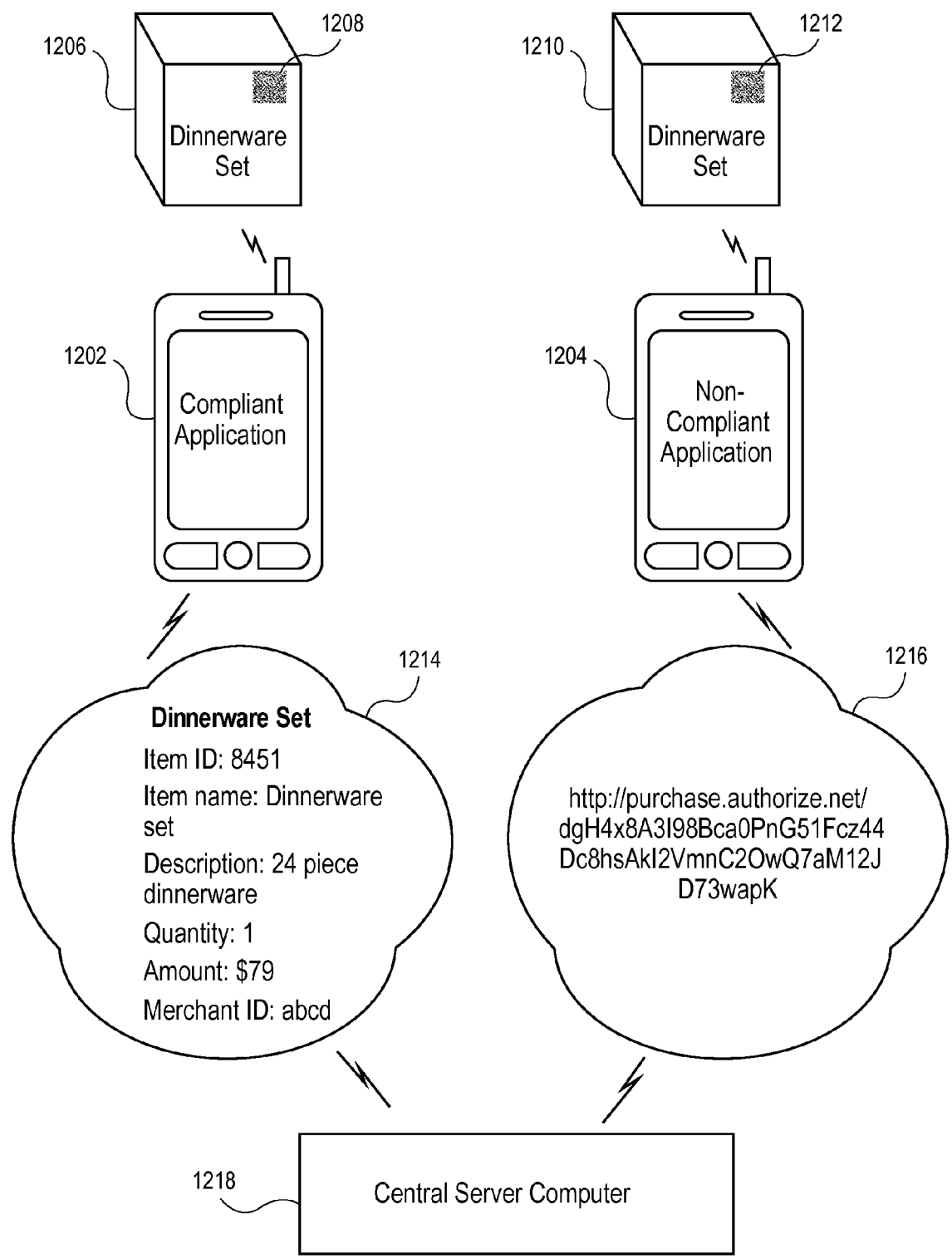
FIG. 12 illustrates an exemplary embodiment with a first electronic device executing a compliant application and a second electronic device executing a non-compliant application in one embodiment of the invention.

FIG. 12 illustrates an exemplary embodiment with a first electronic device 1202 executing a compliant application and a second electronic device 1204 executing a non-compliant application. A first product 1206 (dinnerware set) with a first machine readable code 1208 and a second product 1210 (dinnerware set) with a second machine readable code 1212 are similar type of products, except the item ID may be different for the two products.

The first electronic device 1202 may scan the first machine readable code 1208 associated with the first product 1206 using a compliant machine readable code reader module. The compliant application executing on the first electronic device 1202 may recognize the item information encoded in the first machine readable code 1208 and populate a first form 1214 with the recognizable additional information relating to the first product 1206 on the display screen of the first electronic device 1202. The compliant application further provides the populated form 1214 to a central server computer 1218 for initiating a first transaction using the first populated form 1214.

The electronic device 1204 may scan the machine readable code 1212 associated with the second product 1210 using a non-compliant machine readable code reader module. The non-compliant application executing on the electronic device 1204 may not recognize the item information encoded in the machine readable code 1212 and, therefore, provide the unrecognizable additional information 1216 about the second product 1210 to the central server computer 1218.

The central server computer 1218 receives the first populated form 1214 from the first electronic device 1202 comprising recognizable additional information related to the first product 1206. The central server computer 1218 also receives unrecognizable additional information 1216 from the second electronic device 1202 about the second product 1210. The central server computer 1218 further decodes the unrecognizable additional information 1216 to form second recognizable additional data and insert the second recognizable additional data into a second form. A second transaction may be initiated using the second form by the second electronic device 1204.

Figure 13:
FIG. 13 shows an exemplary smart poster with a machine readable code in one embodiment of the invention.

FIG. 13 shows an exemplary smart poster 1300 with a machine readable code 1302.

The smart poster 1300 illustrates an example where the machine readable code 1302 has been encoded with an advertisement for a play with different links for buying tickets, reading a synopsis, reading the reviews or watching a trailer, etc. A user with an electronic device having a capability to scan a machine readable code can scan the smart poster to get more information about different products or services associated with the machine readable code. An electronic device with a complaint application will have the information available quickly without server access, whereas, an electronic device with a non-compliant application will point to a website with the relevant information. In one embodiment, the user may be able to buy tickets for the play using his electronic device after scanning the machine readable code 1302.

In some embodiments, the machine readable code may encode information about different services, such as, restaurant reservations, transportation services (e.g., taxi, trains, bus), and special events that can be read using an electronic device with a scanner. A user may be able to make reservations or buy tickets by scanning the machine readable code and reading the associated information on the electronic device that has been decoded either on the electronic device or on a server location using the URL provided in the code.

Figure 14:
FIG. 14 illustrates an exemplary QR CODE® with an embedded design in one embodiment of the invention.

FIG. 14 illustrates an exemplary QR CODE® with an embedded design.

As illustrated in the figure, a design 1402 may be embedded in a QR CODE® 1400 which may imply that the code was legitimately generated. The design 1402 may be embedded across any dimensions (e.g., horizontal, vertical, diagonal, etc.) of the code and may be of any shape and size by utilizing the error correction ability of the QR CODE® 1400. The design 1402 may be completely or partially visible and may serve as a seal of certification for a genuine code.

Embodiments of the invention provide the technical benefits of allowing a single (representation of) a trigger for a payment that works across different environments. Electronic devices with compliant applications have the advantage of having quick access to the product information on the electronic device without accessing the server. Auto-populating the product information by decoding the machine readable code on the electronic device saves time and effort for both the merchant and the consumer by minimizing human interaction. Electronic devices with non-compliant application are also able to access the product information on a website pointed to by a URL specified in the machine readable code, instead of displaying meaningless text. Hence, by using embodiments of the invention, any electronic device executing a compliant or a non-complaint application (off the shelf or a third party) capable of scanning a machine readable code associated with a product may be able to view the product information (either on the electronic device without server access or on a website) and proceed with the purchase of the product. Hence, using embodiments of the invention, bandwidth usage can be minimized to check up on any updated prices or validity of offers for every single purchase.

Figure 15:
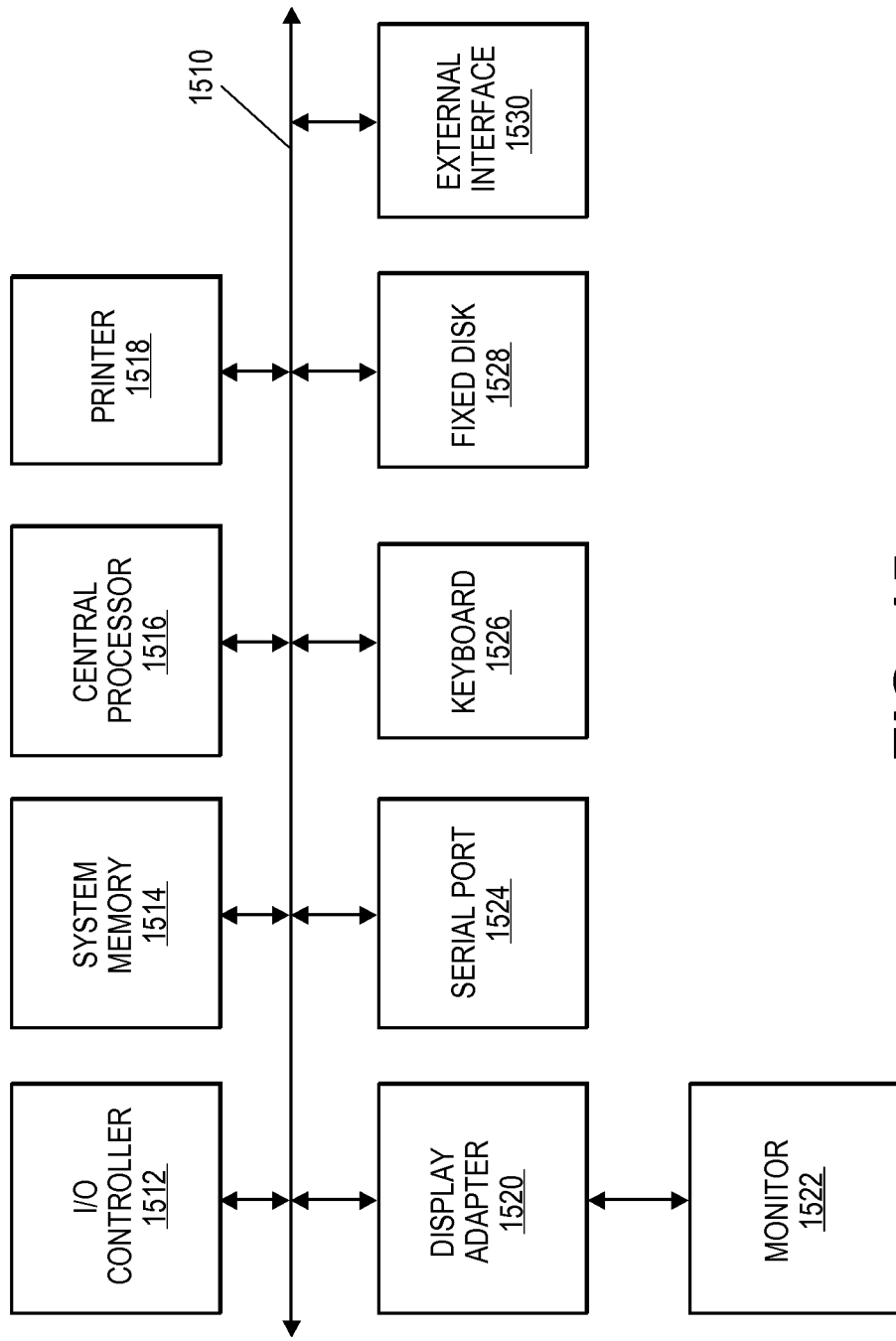
FIG. 15 shows a block diagram of an exemplary computer apparatus that may be used in some embodiments.

The various participants and elements may operate one or more computer apparatuses (e.g., a server computer) to facilitate the functions described herein. Any of the elements in the figures may use any suitable number of subsystems to facilitate the functions described herein. Examples of such subsystems or components are shown in FIG. 15. The subsystems shown in FIG. 15 are interconnected via a system bus 1510. Additional subsystems such as a printer 1518, keyboard 1526, fixed disk 1528 (or other memory comprising computer readable media), monitor 1522, which is coupled to display adapter 1520, and others are shown. Peripherals and input/output (I/O) devices, which couple to I/O controller 1512, can be connected to the computer system by any number of means known in the art, such as serial port 1524. For example, serial port 1524 or external interface 1530 can be used to connect the computer apparatus to a wide area network such as the Internet, a mouse input device, or a scanner. The interconnection via system bus 1510 allows the central processor 1516 to communicate with each subsystem and to control the execution of instructions from system memory 1514 or the fixed disk 1528, as well as the exchange of information between subsystems. The system memory 1514 and/or the fixed disk 1528 may embody a computer readable medium.

Further, while the present invention has been described using a particular combination of hardware and software in the form of control logic and programming code and instructions, it should be recognized that other combinations of hardware and software are also within the scope of the present invention. The present invention may be implemented only in hardware, or only in software, or using combinations thereof.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

One or more features from any embodiment may be combined with one or more features of any other embodiment without departing from the scope of the disclosure.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A central server computer comprising:
   a processor; a computer readable medium coupled to the processor; and a network interface coupled to the processor, the network interface located at a network interface address,
   wherein the network interface is configured to receive a first form comprising first recognizable additional data from a first electronic device that includes a compliant machine readable code reader module, wherein the first recognizable additional data is presented to a user by the first electronic device after a first scanning device in the first electronic device scans a machine readable code associated with a product, the first electronic device identifying at least the network interface address and product information within the scanned machine readable code, the product information being identified by decoding unrecognizable additional data within the scanned machine readable code, wherein the first form is generated from the identified product information, and wherein the first form is received by the network interface at the identified network interface address subsequent to the user of the first electronic device entering a user input associated with the first recognizable additional data,
   wherein the network interface is further configured to receive the unrecognizable additional data from a second electronic device that includes a non-compliant machine readable code reader module, wherein the unrecognizable additional data is received by the network interface after a second scanning device in the second electronic device scans the machine readable code associated with the product, the second electronic device identifying the network interface address but being unable to decode the unrecognizable additional data within the scanned machine readable code, the network interface receiving the unrecognizable additional data at the network interface address identified in the machine readable code, the unrecognizable additional data appended to the network interface address in a uniform resource locator,
   wherein the computer readable medium comprises a decoding module including code that when executed causes the processor to decode the unrecognizable additional data received via the uniform resource locator to form second recognizable additional data to be presented to the second electronic device, wherein the first form is generated by the first electronic device to include the first recognizable additional data, and wherein the central server computer is configured to generate the second form to include the second recognizable additional data in response to receiving an indication from the second electronic device, the second form being generated by auto-filling a network document hosted by the central server with at least a portion of the second recognizable additional data.

2. The central server computer of claim 1 wherein the first recognizable additional data comprises at least one of a product identifier, a product name, a product description, a quantity, a price, an indicator for whether a sale of the product is taxable, a time indicator for when the price is valid and a merchant identifier.

3. The central server computer of claim 1 wherein the network interface is further configured to:

receive location information from the second electronic device, the location information indicating a location at which the second electronic device is located, wherein the computer readable medium further comprises code that when executed causes the processor to:

determine, based at least in part on the received location information, location dependent additional information related to the machine readable code; and populate at least a portion of the second form with the location dependent additional information.

4. The central server computer of claim 3 wherein the location dependent additional information is a tax rate.

5. The central server computer of claim 1, wherein the first form and the second form each represent purchase orders for the product.

6. The central server computer of claim 1, wherein the first recognizable additional data is presented by the first electronic device without interacting with the central server.

7. A method comprising:

receiving, by a central server computer located at a network address, a first populated form comprising first recognizable additional data from a first electronic device that includes a compliant machine readable code reader module, wherein the first recognizable additional data is determined after a first scanning device in the first electronic device scans a machine readable code associated with a first product, the first populated form generated by the first electronic device to include the first recognizable additional data;

initiating, by the central server computer, a first transaction using the first populated form;

receiving, by the central server computer, unrecognizable additional data from a second electronic device that includes a non-compliant machine readable code reader module, wherein the unrecognizable additional data is determined after a second scanning device in the second electronic device scans a second machine readable code, the second machine readable code associated with a second product, the second electronic device identifying the network address but being unable to decode the unrecognizable additional data within the second machine readable code, and the central server computer receiving the unrecognizable additional data at the network address identified in the second machine readable code, the unrecognizable additional data being provided within an address field as being appended to the identified network address;

wherein the central server computer comprises a decoding module configured to decode the unrecognizable additional data received in the address field to identify the second product and present second recognizable additional data to the second electronic device;

generating, in response to receiving an indication from the second electronic device, a second form, the second form generated by the central server computer from the second recognizable additional data and being generated by auto-filling a network document hosted by the central server with at least a portion of the second recognizable additional data; and initiating a second transaction using the second form.

8. The method of claim 7 further comprising:

receiving, by the central server computer, a request for an updated price of the first product from the first electronic device, after the first electronic device determines the first recognizable additional data by scanning the machine readable code associated with the first product; and sending, by the central server computer, the updated price of the first product to the first electronic device.

9. The method of claim 7 further comprising:

receiving, by the central server computer, a request for updated tax information for the first product from the first electronic device, after the first electronic device determines that the location of the first electronic device is outside a jurisdiction for which a tax indicator in the first recognizable additional data is valid; and sending, by the central server computer, an updated tax information for the first product to the first electronic device.

10. The method of claim 9 wherein the first populated form includes the updated tax information for the first product.

11. The method of claim 7 wherein the first product and the second product are the same type of product.

12. The method of claim 7 wherein a receipt is generated including at least a portion of the first recognizable additional data as a result of the first transaction.

* * * * *